United States Patent
Rajasooriya et al.

(10) Patent No.: US 10,650,150 B1
(45) Date of Patent: May 12, 2020

(54) VULNERABILITY LIFE CYCLE EXPLOITATION TIMING MODELING

(71) Applicants: Sasith Maduranga Rajasooriya, Franklin, OH (US); Chris Peter Tsokos, Tampa, FL (US); Pubudu Kalpani K Hitigala Kaluarachchilage, Franklin, OH (US)

(72) Inventors: Sasith Maduranga Rajasooriya, Franklin, OH (US); Chris Peter Tsokos, Tampa, FL (US); Pubudu Kalpani K Hitigala Kaluarachchilage, Franklin, OH (US)

(73) Assignee: University of South Florida, Tampa, FL (US)

( * ) Notice: Subject to any disclaimer, the term of this patent is extended or adjusted under 35 U.S.C. 154(b) by 151 days.

(21) Appl. No.: 15/907,810

(22) Filed: Feb. 28, 2018

Related U.S. Application Data

(60) Provisional application No. 62/464,635, filed on Feb. 28, 2017.

(51) Int. Cl.
*G06F 21/57* (2013.01)
*G06N 7/00* (2006.01)

(52) U.S. Cl.
CPC .......... *G06F 21/577* (2013.01); *G06N 7/005* (2013.01); *G06F 2221/034* (2013.01)

(58) Field of Classification Search
None
See application file for complete search history.

(56) References Cited

U.S. PATENT DOCUMENTS

| 10,268,660 | B1* | 4/2019 | Arazi | A63F 13/50 |
| 2006/0178887 | A1* | 8/2006 | Webber | G10L 15/144 |
| | | | | 704/256 |
| 2008/0010225 | A1* | 1/2008 | Gonsalves | G06N 7/005 |
| | | | | 706/11 |
| 2016/0078309 | A1* | 3/2016 | Feldman | G01B 9/0203 |
| | | | | 382/131 |
| 2017/0046519 | A1* | 2/2017 | Cam | G06F 21/577 |

OTHER PUBLICATIONS

Kaluarachchi, P.K., Tsokos, C.P. and Rajasooriya, S.M. (Apr. 2016) Cybersecurity: A Statistical Predictive Model for the Expected Path Length. Journal of information Security, vol. 7, 112-128. http://dx.doi.org/10.4236/jis.2016.73008.

(Continued)

*Primary Examiner* — Kaveh Abrishamkar
(74) *Attorney, Agent, or Firm* — Thomas | Horstemeyer, LLP

(57) ABSTRACT

According to the embodiments, a statistical model is developed to estimate the probability of being in a certain stage of a particular vulnerability in its life cycle. The methodology with the application of Markov chain theory gives the basis for calculating estimates for probabilities for different stages of a life cycle of the vulnerability considered. Using the developed method, it is possible to evaluate the risk level of a particular vulnerability at a certain time. These developments allow an advantage in taking measures to avoid exploitations and introduce patches for the vulnerability before an attacker takes the advantage of that particular vulnerability.

18 Claims, 13 Drawing Sheets

(56) References Cited

OTHER PUBLICATIONS

Sasith M. Rajasooriya, Chris P. Tsokos, Pubudu Kalpani Kaluarachchi (Jul. 2016) Stochastic Modelling of Vulnerability Life Cycle and Security Risk Evaluation. Journal of Information Security, vol. 7,269-279. http://dx.doi.org/10.4236/jis.2016.74022.

Rajasooriya, S.M., Tsokos, C.P. and Kaluarachchi, P.K. (Apr. 2017) Cyber Security: Nonlinear Stochastic Models for Predicting the Exploitability. Journal of Information Security, vol. 8, 125-140. http://dx.doi.org/10.4236/jis.2017.82009.

Kaluarachchi, P.K., Tsokos, C.P. and Rajasooriya, S.M. (Nov. 2017), Non-Homogeneous Stochastic Model for Cyber Security Predictions. Journal of Information Security,vol. 9, 12-24. https://doi.org/10.4236/jis.2018.91002.

Secunia Vulnerability Review 2015: Key Figures and Facts from a Global Information Security Perspective. Mar. 2015. https://secunia.com/?action=fetch&filename=secunia_vulnerability_review_2015_pdf.pdf.

NVD, National Vulnerability Database, Accessed Jun. 13, 2018, http://nvd.nist.gov/.

Kijsanayothin, P. (May 2010) Network Security Modeling with Intelligent and Complexity Analysis. PhD Dissertation, Texas Tech University, Lubbock.

Alhazmi, O.H., Malaiya, Y.K. and Ray, I. (May 2007) Measuring, Analyzing and Predicting Security Vulnerabilities in Software Systems. Computers and Security Journal, vol. 26, Issue 3, pp. 219-228. doi:10.1016/j.cose.2006.10.002.

Noel, S., Jacobs, M., Kalapa, P. and Jajodia, S. (Nov. 2005) Multiple Coordinated Views for Network Attack Graphs. VIZSEC'05: Proc. of the IEEE Workshops on Visualization for Computer Security, Minneapolis, Oct. 2005, 99-106.

Mehta, V., Bartzis, C., Zhu, H., Clarke, E.M. and Wing, J.M. (Sep. 2006) Ranking Attack Graphs. In: Zamboni, D. and Krugel, C., Eds., Recent Advances in Intrusion Detection, RAID 2006, Lecture Notes in Computer Science, vol. 4219, Springer, Berlin, Heidelberg, 127-144. http://dx.doi.org/10.1007/11856214_7.

Frei, S. (2009) Security Econometrics: The Dynamics of (IN) Security, vol. 93, PhD Dissertation, ETH, Zurich.

Schiffman, M. (2014) Common Vulnerability Scoring System (CVSS). http://www.first.org/cvss/.

Bass, T. (Apr. 2000) Intrusion Detection System and Multi-Sensor Data Fusion. Communications of the ACM, vol. 43, Issue 4, pp. 99-105.

Jajodia, S. and Noel, S. (2005) Advanced Cyber Attack Modeling, Analysis, and Visualization. 14th USENIX Security Symposium, Technical Report, Mar. 2010, George Mason University, Fairfax, VA.

Abraham, S. and Nair, S. (Dec. 2014) Cyber Security Analytics: A Stochastic Model for Security Quantification Using Absorbing Markov Chains. Journal of Communications, vol. 9, No. 12, 899-907. https://doi.org/10.12720/jcm.9.12.899-907.

Wang, L., Singhal, A. and Jajodia, S. (Jul. 2007) Measuring Overall Security of Network Configurations Using Attack Graphs. Data and Applications Security XXI, Lecture Notes in Computer Science, vol. 4602. Springer, Berlin, Heidelberg , 98-112. https://doi.org/10.1007/978-3-540-73538-0_9.

Wang, L., Islam, T., Long, T., Singhal, A. and Jajodia, S. (Mar. 2008) An Attack Graph-Based Probabilistic Security Metric. DAS 2008, LNCS 5094, 283-296.

R statistics Tool. http://www.r-project.org, accessed Jun. 12, 2018.

Joh, H. and Malaiya, Y.K. (2010) A Framework for Software Security Risk Evaluation Using the Vulnerability Lifecycle and CVSS Metrics. Proceedings of the International Workshop on Risk and Trust in Extended Enterprises, Nov. 2010, 430-434.

Alhazmi, O.H. and Malaiya, Y.K. (Mar. 2008) Application of Vulnerability Discovery Models to Major Operating Systems. IEEE Transactions on Reliability, vol. 57, Issue 1, pp. 14-22. http://dx.doi.org/10.1109/TR.2008.916872.

Alhazmi, O.H. and Malaiya, Y.K. (Dec. 2005) Modeling the Vulnerability Discovery Process. Proceedings of 16th International Symposium on Software Reliability Engineering, Chicago, Nov. 8-11, 2005, 129-138. http://dx.doi.org/10.1109/ISSRE.2005.30.

CVE Details, Accessed on Jun. 14, 2018, http://www.cvedetails.com/.

2016 U.S Government Cybersecurity Report. Security Scorecard R&D Department, Apr. 2016. https://cdn2.hubspot.net/hubfs/533449/SecurityScorecard_2016_Govt_Cybersecurity_Report.pdf.

Symantec, Internet Security Threat Report 2016, vol. 21, Apr. 2016. https://www.symantec.com/content/dam/symantec/docs/reports/istr-21-2016-en.pdf.

Dudorov, et al., Probability Analysis of Cyber Attack Paths against Business and Commercial Enterprise Systems, Intelligence and Security Informatics Conference (EISIC), 2013 European, Aug. 2013.

Marconato, et al., Security-related vulnerability life cycle analysis, 2012 7th International Conference on Risks and Security of Internet and Systems (CRiSIS), Oct. 2012.

Marconato, et al., A Vulnerability Life Cycle-Based Security Modeling and Evaluation Approach, The Computer Journal, vol. 56, No. 4, Oxford University Press on behalf of The British Computer Society, Advanced Access on Sep. 3, 2012.

Mkpong-Ruffin, et al., Quantitative Software Security Risk Assessment Model, QoP '07 Proceedings of the 2007 ACM workshop on Quality of protection, Oct. 2007.

"H. Joh and Y. K. Malaiya, Defining and Assessing Quantitative Security RiskMeasures Using Vulnerability Lifecycle and CVSS Metrics, The 2011 International Conference on Security and Management (sam), Jul. 2011."

Singhal, A. and Ou, X., Security Risk Analysis of Enterprise Networks Using Probabilistic Attack Graphs, NIST Interagency Report 7788, Aug. 2011, Computer Security Division Information Technology Laboratory National Institute of Standards and Technology, Gaithersburg, MD.

Xie, Lixia, Xiao Zhang, and Jiyong Zhang. "Network Security Risk Assessment Based on Attack Graph." Journal of Computers, vol. 8, No. 9 (Sep. 2013): 2339-2347.

Homer, John, Xinming Ou, and David Schmidt. "A sound and practical approach to quantifying security risk in enterprise networks." Kansas State University Technical Report, Computing and Information Sciences Department. Aug. 2009, pp. 1-15.

Secunia Research, "Key figures and facts on vulnerabilities from a global information security perspective", Vulnerability Review 2016, Mar. 2016, Flexera Software LLC.

* cited by examiner

VULNERABILITY LIFE CYCLE EXPLOITATION TIMING MODELING

CROSS-REFERENCE TO RELATED APPLICATIONS

This application claims the benefit of U.S. Provisional Application No. 62/464,635, filed Feb. 28, 2017, the entire contents of which is hereby incorporated herein by reference. This application is also related to U.S. Non-Provisional application Ser. No. 15/875,249, filed Jan. 19, 2018, the entire contents of which is hereby incorporated herein by reference. This application is also related to U.S. Non-Provisional application Ser. No. 15/907,968, titled "STATISTICAL PREDICTIVE MODEL FOR EXPECTED PATH LENGTH," filed on even date herewith, the entire contents of which is hereby incorporated herein by reference.

BACKGROUND

In computing systems, a vulnerability can be defined as a weakness in software, hardware, firmware, etc. that can be exploited to gain access to certain resources. The management of vulnerabilities includes the practice of identifying and classifying vulnerabilities in computing systems and removing them. A vulnerability for which a working and implemented attack is known can be described as an exploitable vulnerability. A vulnerability is exploitable from the time when it is introduced to when it is removed or patched.

Vulnerabilities can be relatively difficult to categorize and mitigate. The Common Vulnerability Scoring System (CVSS) provides a way to characterize or define the principal characteristics of a vulnerability. The CVSS also provides a numerical score that reflects the severity of various vulnerabilities. The numerical score can be presented as a qualitative representation (e.g., low, medium, and high risk) to help prioritize vulnerability management processes.

BRIEF DESCRIPTION OF THE DRAWINGS

For a more complete understanding of the embodiments and the advantages thereof, reference is now made to the following description, in conjunction with the accompanying figures briefly described as follows.

Figure 1:
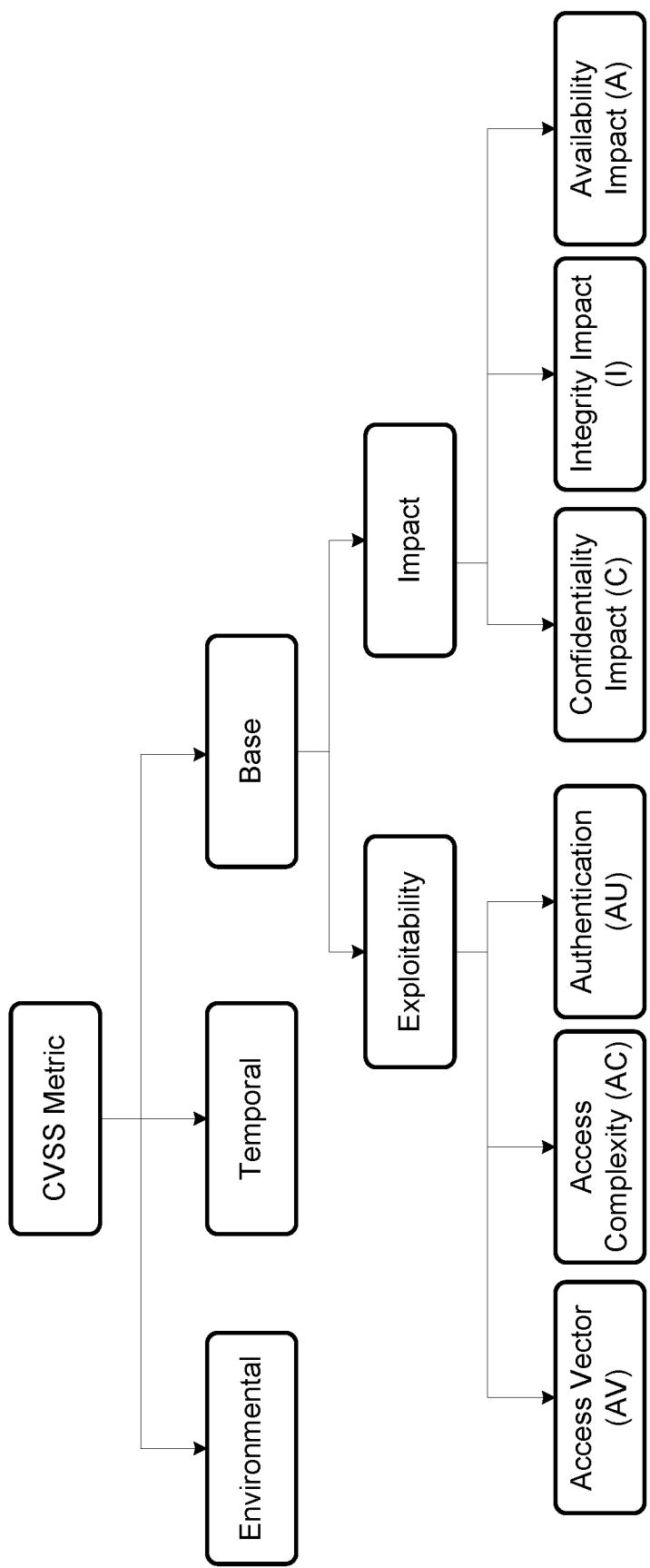
FIG. 1 illustrates organizational aspects of the Common Vulnerability Scoring System (CVSS) framework according to various examples described herein.

The drawings illustrate only example embodiments and are therefore not to be considered limiting of the scope of the embodiments described herein, as other embodiments are within the scope of the disclosure.

DETAILED DESCRIPTION

To protect network-accessible resources from attacks, various Intrusion Detection Systems (IDSs) are available. These intrusion detection and prevention based tools can provide signals to alert network administrators of intrusions, providing them with a picture of activities on the network. One important challenge for such IDSs is to develop mechanisms to aggregate the security risk of all systems in a network, evaluate the overall security risk for the systems, and present meaningful feedback and suggestions to network administrators.

To evaluate the security risk of a large scale enterprise network of computing systems, an administrator should consider not only single vulnerability exploits but also multi-stage and multi-host vulnerability exploits. To account for such multi-stage vulnerabilities, a host access attack graph can be relied upon to examine the logical relationships between multiple exploits. However, when the size and complexity of enterprise networks increase, two major problems occur. First, the host access attack graphs grow exponentially as the size of the networks increase in complexity. Second, the ability to evaluate the information conveyed in the host access attack graphs becomes more and more difficult. To help with those problems (and others in the field), recent studies have developed some useful statistical models that predict security risks based on various vulnerabilities using the Common Vulnerability Scoring System (CVSS) framework with a Markovian process.

The CVSS framework provides an open framework for communicating and analyzing the characteristics and impacts of vulnerabilities in computing systems. The quantitative model of the CVSS framework leads to repeatable and accurate measurements while enabling users to see the underlying vulnerability characteristics used to generate vulnerability-related scores. Thus, the CVSS framework is suitable as a standard measurement system for industries, organizations, and governments to accurately and consistently analyze vulnerabilities. Two common uses of the CVSS framework are the prioritization of vulnerability remediation activities and the calculation of the severity of vulnerabilities. The National Vulnerability Database (NVD) provides CVSS scores for almost all known vulnerabilities.

Risk metrics in the CVSS framework are composed of a number of metric groups, such as base, temporal, and environmental metrics, among others. Base metrics are constant over time across user environments and are related to the intrinsic characteristics of vulnerabilities. Base metrics include exploitability and impact metrics. The exploitability metrics are related to the ease and technical means by which a vulnerability can be exploited. The impact metrics are related to the consequences that can occur to components after a successful exploit. For example, while a vulnerable component can be a software application, module, driver, etc., the impacted component can be a different software application, hardware device, or network resource. Temporal metrics are related to the characteristics of a vulnerability that change over time but not across environments. Environmental metrics are related to the characteristics of a vulnerability that are unique to a particular user environment (but might not change over time).

The values of base metrics can be assigned by an analyst, determined by a base metric score equation, determined by an equation and adjusted by an analyst, or calculated in other ways. A base metric can be computed as a score ranging from 0.0 to 10.0, for example, but other ranges can be used. An example equation to calculate a base metric score can be formed as two sub equations, for example, such as an exploitability sub-score equation for the exploitability sub score and an impact sub-score equation for the impact sub score. Base metric scores can be refined by the temporal and/or environmental metric scores in some cases to more accurately reflect risks posed by vulnerabilities in certain environments and/or over time.

A vulnerability is a flaw that exists in a computing system that can be exploited by one or more threats. In the context of vulnerabilities, a software vulnerability is an instance of an error in the specification, development, or configuration of software such that its execution can violate a security policy. Attackers normally use known vulnerabilities listed publicly on the NVD to penetrate computing systems. In some cases, attackers can leverage vulnerabilities that have not been disclosed publicly, called zero day vulnerabilities. Zero day vulnerabilities remain unknown to vendors, and such vulnerabilities gives attackers a "free pass" to attack certain hosts.

Attackers often penetrate computer networks via a chain of exploits, where each exploit in the chain creates the foundation for an upcoming exploit. A combination (e.g., chain) of such exploits is called an attack path, and a collection of attack paths can be used to develop an attack graph. Thus, an attack graph is representative of all known paths through which an attacker can infiltrate and attack a system. Various algorithms have been developed to construct attack graphs. However, it is relatively difficult to analyze networks using attack graphs, particularly as the number of nodes and complexity of networks increase. As the scalability and complexity of networks increase, the computational costs needed to create and evaluate attack graphs also increases. At the same time, without complicated attack graphs, it might not be possible to analyze the vulnerabilities in complex computing systems.

According to the embodiments described herein, a stochastic model is proposed for the evaluation of security risks in networks. Among other modelling data, the model uses exploitability and impact sub-scores of the CVSS framework. As described in further detail below, an example network having three host servers, each including one vulnerability, is considered. Based on the network architecture and vulnerabilities of the example network, a host access attack graph is constructed. From the host access attack graph, a state transition probability matrix is computed using exploitability and impact sub-scores. Using the Markovian random walk, the risk associated with each node is prioritized by ranking. Finally, the risk associated with all the nodes present in the network is summed, and the overall network security risk is determined. This quantitative value can be taken as a security metric to determine the risk of an entire network.

Further, new types of attack graphs can be relied upon among the embodiments. For example, a multiple layer attack graph can include upper and lower layers. The upper layer can include a host access attack graph and the lower layer can include host pair attack graphs. The lower level can describe the detailed attack scenarios between each host pair, and the upper level can show the direct network access relationship between each host pair. According to aspects of one embodiment, the stochastic models described herein can be based on upper layer attack or host access attack graphs.

In another embodiment, a new "risk factor" concept of vulnerability can be calculated as a function of time. In that concept, a Markovian approach can be introduced to estimate the probability of a particular vulnerability being at a particular "state" of a vulnerability life cycle. Here, those concepts and models are further developed using available data sources in a probabilistic foundation to enhance reliability. Other useful modeling strategies for vulnerability risk estimation are also introduced. For example, a new set of non-linear statistical models is presented. The models can be used in estimating the probability of being exploited as a function of time.

System administrators work to understand attackers and attack strategies to more effectively defend against attacks. To defend against attacks, it is helpful to develop a proper understanding of the risk associated with a given vulnerability. Having an effective model that predicts the risk of a given vulnerability being exploited as a function of time would be helpful to plan and implement security measures, allocate relevant resources, and defend systems accordingly. According to the embodiments described herein, the Markovian approach to vulnerability life cycle analysis is further developed to arrive at better modeling techniques to evaluate the "risk factor" using probability and statistical methods.

Thus, procedures to identify the probabilities for different states in a vulnerability life cycle are described. The probabilities are used to develop a number of statistical models to evaluate the risk factor of a particular vulnerability at time "t". An absorbing transition probability matrix of all states of a particular vulnerability as a function of time is also described. A Markov chain process can be iterated to reach a steady state of the absorbing transition probability matrix, with the initial probabilities reaching the absorbing states, including exploited and patched states. A risk factor is also introduced for use as an index of the risk of a vulnerability being exploited. Finally, statistical models that can calculate the risk factor more conveniently without going through the Markovian process are described.

In one embodiment, a logical and approach is used to assign initial probabilities for each state of vulnerability. Additionally, the initial probabilities for each state of a vulnerability life cycle can be further refined based on certain logical assumptions. For example, CVSS scores can be used, but the initial probabilities can be refined or further calculated by taking the Common Vulnerabilities and Exposures (CVE) database (http://www.cvedetails.com/), at least in part, into consideration.

Additionally, using the methods described herein, three new statistical models are developed for vulnerabilities that differ based on their vulnerability score. Using these models, a user can estimate the risk of a particular vulnerability being exploited at time "t" and observe the expected behavior of the vulnerability throughout its life cycle.

FIG. 1 illustrates organizational aspects of the CVSS framework. CVSS is the open framework that provides quantitative scores representing the overall severity and risk of known vulnerabilities. A CVSS score can fall on a scale from 0 to 10, for example, and consists of three major metrics, including base, temporal, and environmental as shown in FIG. 1. Vulnerabilities with a base score range from about 0-3.9 can be considered relatively low vulnerability, 4.0-6.9 can be considered relatively medium vulnerability, and 7.0-10 can be considered relatively high vulnerability.

The base score can be computed using a number of sub-scores, such as the exploitability and impact sub-scores shown in FIG. 1. The exploitability sub-score can be computed based on a combination of the access vector (AU), access complexity (AC), and authentication (AU) sub-scores. Further, the impact sub-score can be computed based on a combination of the confidentiality (C), integrity (I), and availability (A) sub-scores.

A Markov chain is one modeling technique that has been used effectively in various fields, such as reliability analysis, performance analysis, dependability analysis, and cybersecurity analysis, among others. As described below, the host access attack graph can be modeled using a Markov chain with the real behavior of the attacker in conjunction with the Markovian properties.

Mathematically, a Markov chain can be defined as a discrete stochastic process. More specifically, let S be a set of states. A Markov chain is a sequence of random variables $X_0, X_1, X_2, \ldots X_n \in S$ that satisfies the "Markovian property":

$$P[X_{n+1}=y|X_0=x_0, X_1=x_1, \ldots X_n=x_n]=P[X_{n+1}=y|X_n=x_n] \quad (1)$$

The Markovian property reveals the fact that the transitions between states are memoryless and that transitioning to the next step depends only on the current state and not on any previous states. This property can be correlated with the behavior of an attacker in the sense that an attacker needs to exploit several nodes before reaching a goal node. When the attacker starts attacking an initial node to reach the goal node, there can be many other nodes, called intermediate nodes, before reaching the goal node. When an attacker reaches any intermediate node, there is no memory of previous nodes. The attacker launches further attacks until the goal node is found.

To advance the attack, an attacker can move from one intermediate node to another intermediate node. In the examples described herein, the selection of the best intermediate node depends on three parameters, including the exploitability sub-score, the impact sub-score, and the bias factor or skill of the attacker.

Without loss of generality, transition states are independent of time. Mathematically, there exists some state transition probability matrix, $P(x, y)$, such that:

$$P(x,y)=P[X_{n+1}=y|X_n=x_n], \text{ for all } n. \quad (2)$$

A new set of states $S \times [n]$ can be created having a different set of states associated with each timestep. To simulate a Markov chain, a stochastic state transition probability matrix $P(x, y)$ and an initial probability distribution is needed. The initial risk associated with each node in the host access attack graph can be considered an initial probability distribution as described in further detail below. Once the stochastic state transition probability matrix $P(x,y)$ and initial risk are determined, then the risk of the entire network can be determined utilizing the basic properties of the Markovian process.

Figure 2:
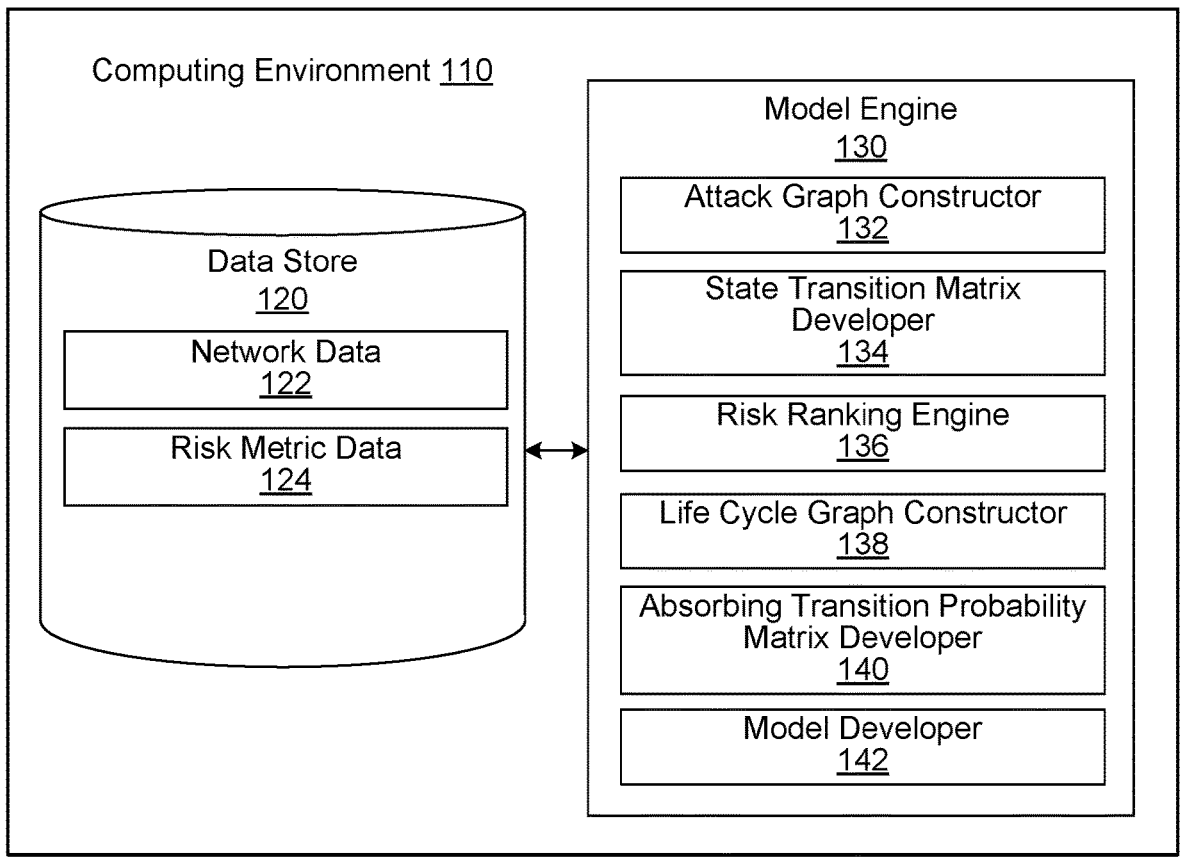
FIG. 2 illustrates a computing environment for the generation of a predictive security model according to various examples described herein.

FIG. 2 illustrates a computing environment 110 for the generation of a predictive security model according to various examples described herein. Among other components, the computing environment 110 includes a data store 120 and a model engine 130. Among other data, the data store 120 includes memory areas to store network data 122 and risk metric data 124. The model engine 130 includes an attack graph constructor 132, a state transition matrix developer 134, and a risk ranking engine 136, the operation of each of which is described in further detail below with reference to FIGS. 3A, 3B, 4, 5, 7A, and 7B. The model engine 130 further includes a life cycle graph constructor 138, an absorbing transition probability matrix developer 140, and a model developer 142, the operation of each of which is described in further detail below with reference to FIGS. 8-10, 11A-11D, and 12. The model engine 130 can omit one or more of the components shown in FIG. 2 and/or include other components not shown in FIG. 2.

The computing environment 110 can be embodied as one or more computing devices or systems. In various embodiments, the computing environment 110 can be embodied as a desktop, laptop, server or other type(s) of computing devices or systems. As described herein, the model engine 130 in the computing environment 110 is configured to generate a predictive security model. The model can be generated to evaluate relatively large networks of computing systems having a number of network nodes. The computing systems and devices in such networks can be located at a single installation site or distributed among different geographical locations. The computing devices in such networks can also include computing devices that together embody a hosted computing resource, a grid computing resource, and/or other distributed computing arrangement.

The computing environment 110 and the network of computing systems evaluated by the computing environment 110 can be coupled to one or more networks embodied by the Internet, intranets, extranets, wide area networks (WANs), local area networks (LANs), wired networks, wireless (e.g., cellular, 802.11-based (WiFi), bluetooth, etc.) networks, cable networks, satellite networks, other suitable networks, or any combinations thereof. The computing environment 110 can communicate with other computing devices and systems using any suitable systems interconnect models and/or protocols. Although not illustrated in FIG. 2, the computing environment 110 can be coupled to any number of network hosts, such as website servers, file servers, network switches, networked computing resources, databases, data stores, and other network or computing platforms.

The network data 122 can include data related to the network of computing systems being evaluated by the model engine 130, which the computing environment 110 may or may not be coupled to. In that context, the network data 122 can define the types of network and computing devices and systems being evaluated by the model engine 130, such as the serial numbers, model numbers, operating system versions, services, and other identifying information. The network data 122 can also specify the logical arrangement of those devices among each other, including the network connections between them. The network data 122 can include all the information necessary for the attack graph constructor 132 to generate a host access attack graph as described herein.

The risk metric data 124 can include a number of risk metrics, including CVSS and CVE data, associated with devices specified in the network data 122. As one example, according to the CVSS framework, the risk metrics can include base, temporal, and environmental metrics, among others, for the devices specified in the network data 122. However, the risk metric data 124 is not limited to the types of metrics used in the CVSS framework, as other types and formats of risk metrics can be relied upon.

The attack graph constructor 132 is configured to construct host access attack graphs based on the network data 122. The network topology information defined in the network data 122 can include serial numbers, model numbers, operating system versions, services, and other identifying information. The network topology information can also specify the logical arrangement of host devices among each other, including the network connections between them. The network topology information can specify a number of hosts in enterprise systems, services running on each host in the network, rules defined on firewalls, network switches, etc., and vulnerabilities associated with each host and service among other topology information. For simplicity, a limited number of nodes are present in the examples described herein, but attack graphs of any size can be used. In the attack graphs described herein, each node can be representative of any of the above-described (or related) types of host computing devices, systems, or services. Each host can include various types of vulnerabilities. Example attack graphs are shown in FIGS. 3A and 3B and described below.

Once an attack graph is created, scores can be assigned to the vulnerabilities of the hosts in the attack graph using information from the risk metric data 124, such as CVSS framework metric data. The scores can be computed based on a number of scores and sub-scores, such as those shown in FIG. 1, for example, using one or more expressions, equations, or sub-equations that relate them. In some cases, one or more standard expressions can be used to calculate scores based on matrices that provide a quantitative score to approximate the ease and/or impact of the vulnerabilities in the nodes. The exploitability and impact sub-scores, for example, can also be combined to provide the basis of assigning scores to directed connections among the nodes in attack graphs as probabilities. Those probabilities can represent the possibility of a vulnerability being exploited by an attacker.

To implement the stochastic model, the behavior of the attacker should also be considered. As one example, it can be assumed that the attacker would choose a vulnerability that maximizes the chances of success in the goal. In one example, if the attacker terminates attacking for any reason, then the model can move the attacker back to the initial state. Finally, utilizing the properties of a Markov chain, the risk of one or more individual nodes can be computed. The nodes are then prioritized based on risk, and the risks of all the nodes are summed to give the total security risk present in the computing system environment.

Figure 3A:
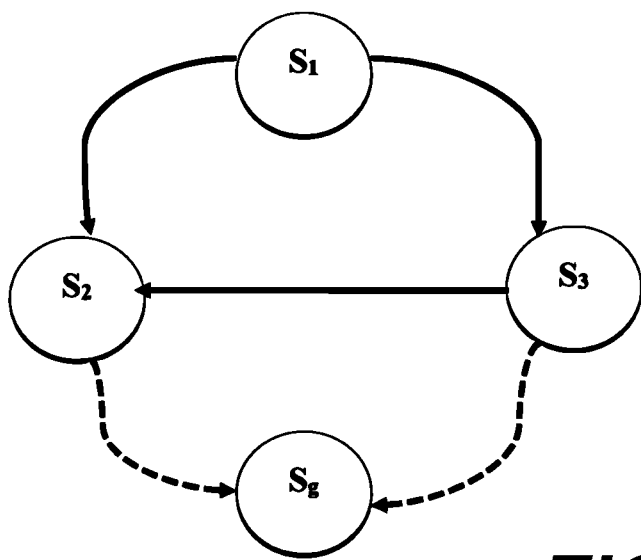
FIG. 3A illustrates an example host access attack graph according to various examples described herein.
Figure 3B:
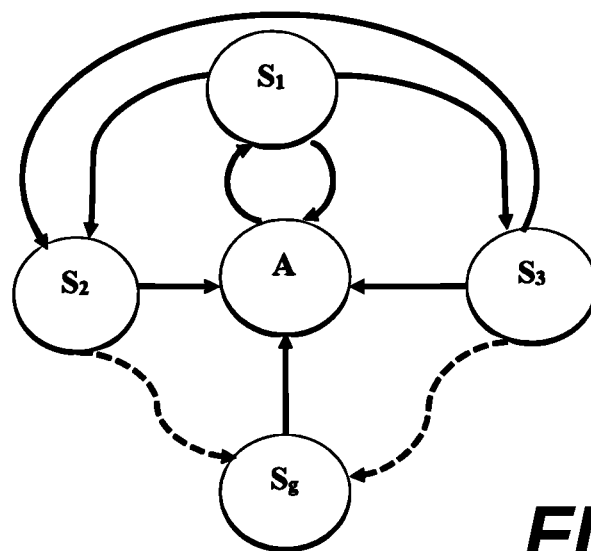
FIG. 3B illustrates the example host access attack graph shown in FIG. 3B along with an additional node related to an attacker in the system according to various examples described herein.

FIG. 3A illustrates an example host access attack graph for a networked computing environment according to various examples described herein. In FIG. 3A, $S_i$, i=1, 2, 3, . . . g are host nodes and $S_g$ is a goal node. The host access attack graph shown in FIG. 3A is a representative example, and host access attack graph can be constructed to any size necessary and with any number of intermediate layers.

A node in the host access attack graph is representative of a computing device or system in the networked computing environment. Each node can be representative of a different type of computing device, such as a server, desktop, laptop, handheld, or other type of computing system. The nodes can also be representative of other types of network devices including network switches, routers, firewalls, and other devices. In some cases, the nodes can also be representative of one or more software services executing on one or more computing devices.

A directed connection (e.g., arrowed line) between two nodes represents the access relationship between the nodes. In FIG. 3A, a directed connection from host $S_1$ to host $S_2$ represents the access available on $S_2$ from $S_1$, and the same is applicable to other hosts. In the example shown, there is one directed connection from any given node to any other node. As such, the host access attack graph shown in FIG. 3A does not include multiple connections between the same two nodes. In other cases, the host access attack graph can include a number of connections between two or more nodes. In one example, the model retains only the highest access achieved between hosts, because higher levels of access to the destination or goal host mean more powerful attacks can be achieved.

Once the host access attack graph is constructed by the attack graph constructor 132, then the basic foundation is developed for further analysis by the state transition matrix developer 134 and the risk ranking engine 136. To make the host access attack graph more applicable and realistic, an additional dummy node is added as shown in FIG. 3B to represent the attacker. The attacker can start by exploiting an immediate node by gaining a high level of privileges, for example. In the proposed model, an attacker starts attacking an immediate node and continues to launch attacks until the attacker reaches a goal node.

However, even if an attacker is equipped with sophisticated tools and a high level of experience, there is no guarantee that the attacker will reach the goal node. This can happen if the attacker is unable to exploit a certain vulnerability, the attacker is discovered by an intrusion response team, or other circumstances. According to one case for the model, when the attacker stops launching attacks at any point for any reason, the attacker goes back to the initial state from where the attack began. To incorporate this attack scenario, the attacker node A is introduced as shown in FIG. 3B. Thus, in FIG. 3B, node A represents an attacker, and there is a directed connection from every node to node A. This implies that when the attacker gives up exploiting the node for any reason, the attacker goes back to the initial state and proceeds to search for alternative options. From any node $S_i$, this return directed connection can be defined as ($S_i$, A).

The state transition matrix developer 134 is configured to develop a state transition probability matrix based on exploitability scores and impact scores, for example, associated with individual nodes in the host access attack graph. The state transition probability matrix defines certain probability metrics related to the order in which nodes in an attack graph are likely to be attacked. In one case, it can be assumed that the decisions of an attacker depends on two parameters. The first parameter is exploitability, related to the level of complexity involved to attack a given node. The second parameter is impact, related to how much impact an attacker can make when the node is exploited. The CVSS framework provides numerical scores for those parameters, where 0 signifies the most secure and 10 signifies the least secure. These two parameters can be conceptually expressed by:

$$\text{ExploitabilityBenefit} = f(\text{Exploitability}, \text{Impact}). \quad (3)$$

In Equation 3, ExploitabilityBenefit is defined as a function of the exploitability and impact metrics. Based on these values, the state transition matrix developer 134 can estimate how an attacker would determine or consider the benefit to move from one node to another.

Figure 4:
FIG. 4 illustrates two nodes from a host access attack graph according to various examples described herein.

To clarify this concept, consider any two nodes from the host access attack graph shown in FIG. 4, where $S_j$ and $S_k$ are nodes j and node k, respectively, with $V_j$ and $V_k$ being the corresponding vulnerabilities. In FIG. 4, there is a directed connection from node j to node k. The value of ExploitabilityBenefit in the case of FIG. 4 is representative of whether an attacker would decide to move from node j to node k.

The decision to move from one node to another node can depend not only on the exploitability and impact factors, but also on the skills and expertise of the attacker. The state transition matrix developer 134 can account for the skills and expertise of an attacker using a bias factor, which can vary in value from attacker to attacker. Incorporating all three parameters (i.e., exploitability, impact, and bias), Equation 3 can be extended to:

$$a_{jk} = \beta \cdot \text{Exp}(v_k) + (1-\beta) \cdot \text{impact}(v_k), \text{ where } 0 < \beta \le 1. \quad (4)$$

In Equation 4, $a_{jk}$ is the ExploitabilityBenefit score to move from node j to node k, $\text{Exp}(v_k)$ is a function that measures the level of difficulty in exploiting node k, and Impact $(v_k)$ is a function that measures the potential damages or losses that occur due to a successful exploitation of node k. The quantitative value related to the level of difficulty can be provided by CVSS, and the quantitative value related to the potential damages or losses can be also provided by CVSS.

The possibility that exploitation might occur depends on the experience and skills of the attacker. To account for that factor, the bias factor β can range from 0 to 1 based on the level of experience and skill of the attacker. When the exploitability and impact scores are combined with their corresponding bias factors, a weighted value (i.e., the ExploitabilityBenefit, $a_{jk}$) is obtained to quantify the benefit for an attacker to move from node j to node k.

To move the attacker from an initial node to a goal node, the attacker may need to penetrate several intermediate nodes. Assuming j is an initial node, g is a goal node, and three intermediate nodes k, l, and m, one possibility is that the attacker reaches the goal node by exploiting node j to node k, node k to node l, node l to node m, and finally node m to node g. Thus, the state transition matrix developer 134 is configured to develop a weighted adjacency matrix A, such as:

$$A = \begin{bmatrix} a_{00} & a_{01} & \ldots & a_{0g} & \ldots & a_{0n} \\ a_{01} & 0 & \ldots & a_{1g} & \ldots & a_{1n} \\ \vdots & \vdots & \ldots & \vdots & \vdots & \vdots \\ \vdots & \vdots & \ldots & \vdots & \vdots & \vdots \\ a_{n0} & a_{n1} & \ldots & a_{ng} & \ldots & 0 \end{bmatrix} \quad (5)$$

Each element of the adjacency matrix A can be computed by the state transition matrix developer 134 using Equation 2. Diagonal values of the adjacency matrix A are all zero because no cost is involved to move from the current node to itself. The elements of the adjacency matrix A are not normalized, and the state transition matrix developer 134 can convert the non-normalized values into probabilities using Equation 6. Equation 6 defines that, in each step, the attacker goes from node j to k with a probability given by:

$$p_{jk} = \frac{A(j,k)}{\sum_l A(j,l)}. \quad (6)$$

Writing Equation 6 in matrix form:

$$P = DA, \quad (7)$$

where, A is the weighted adjacency matrix, P is the state transition probability matrix that provides the transition probability that the attacker moves from one state to another state, and D is the diagonal matrix computed using Equation 8 below.

$$D_{jk} = \begin{cases} \frac{1}{\sum_l A(j,l)} & \text{if } j = k \\ 0 & \text{Otherwise} \end{cases} \quad (8)$$

Thus, using Equations (3)-(8), the state transition matrix developer 134 can develop a state transition probability matrix representative of the probability that an attacker moves from one state to another state in the host access attack graph constructed by the attack graph constructor 132.

The risk ranking engine 136 is configured to rank the risk associated with the nodes in the host access attack graph constructed by the attack graph constructor 132 with reference to the state transition probability matrix developed by the state transition matrix developer 134. The risk analysis is based on the relative rank value for every node of the host access attack graph. In this context, R is the risk vector and its initial risk value is computed based on the number of hosts present in the host access attack graph. If N nodes exist in the host access attack graph, then all the node ranks can equal 1/N. This initial risk is first injected by the starting node of an attacker. Risk values flow, level by level, until convergence. The risk ranking and total risk calculation process is described in further detail below with reference to FIG. 7B.

The risk value of $r_k$ for a node k depends upon the rank of its parent nodes. The risk value of the node set by the initial node represents the starting node of the attacker. When the ranking process is started, the intermediate risk value or values are computed via iteration. The intermediate values will flow, level by level, until a steady state is achieved. Mathematically, if $r_k$ is the risk of node k given in the host access attack graph, then the risk ranking engine 136 can compute the risk of node k using Equation 9, by:

$$r_k = \Sigma r_j p_{jk}. \quad (9)$$

Suppose, $R = (r_1, r_2, r_3, \ldots r_z)$ is the risk vector, where $r_j$ is the rank of node j. In that case, Equation 9 can be further extended to Equation 10 as shown below. The risk values are normalized, where $0 \le r_k \le 1$ for all j, and $\Sigma r_k = 1$. Thus, written in matrix form, the risk vector R is given by R times the state transition probability matrix P, by:

$$R = RP \qquad (10)$$

The value of R in Equation 7 is recursive and must be iteratively calculated until convergence, which is expressed by Equation 11 as:

$$R^t = R^{t-1} P. \qquad (11)$$

The risk ranking engine 136 is configured to evaluate the risk in the attacking process based on the Markovian random walk, a condition for the iterative computation to converge. The probability distribution of risk analysis of the host access attack graph after the attacker follows one link in the graph is $R^1 = RP$, where R is the risk vector and P is the one step state transition probability matrix identified by Equation 4. Similarly, after two links, the probability distribution is $R^2 = R^1 P$. Assuming this iteration converges to a steady state probability, then we have $R^t = R^{t-1} P$, where $R^t$ is an eigenvector of P.

Figure 5:
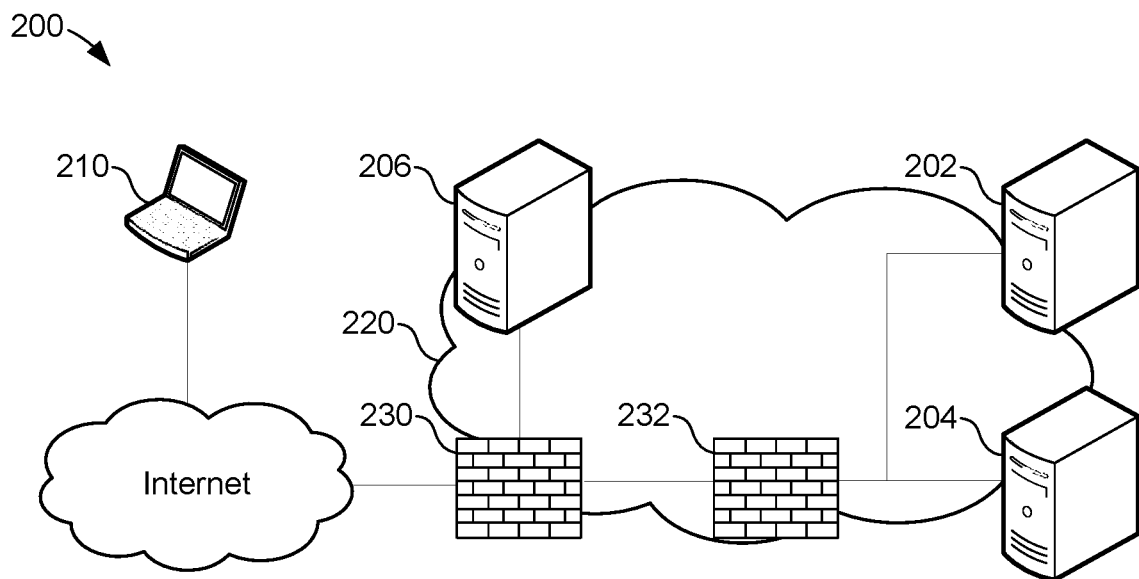
FIG. 5 illustrates an example computing network scenario under evaluation according to various examples described herein.

To validate the proposed stochastic model, a network environment 200 is shown in FIG. 5. The network environment 200 includes a number of target hosts, including a publicly accessible web server 202, a publicly accessible file server 204, and a backend database server 206 of a network 220. An attacker 210 is located outside the network 220. Packet transmissions are controlled via two firewalls, including an external firewall 230 and an internal firewall 232. The external firewall 230 allows any packet to be transmitted to the web server 202 and the file server 204 from outside the network 220, but the backend database server 206 cannot be directly accessed from outside the network 220. The internal firewall 232 manages the transmission of packets within the network 220.

Rules are created for the firewalls 230 and 232 to filter inbound and outbound traffic. A summary of the rules of the firewalls 230 and 232 are shown in Table 1 below.

TABLE 1

| Source | Destination | Service | Action |
| --- | --- | --- | --- |
| All | Web Server | http | Allow |
| All | Web Server | ftp | Allow |
| All | File Server | ftp | Allow |
| Web Server | Database | oracle | Allow |
| File Server | Database | ftp | Allow |
| All | All | All | Deny |

Each of the target hosts in the network shown in FIG. 5 includes a single vulnerability. An attacker can utilize the vulnerability to compromise the host. The vulnerabilities are shown in Table 2 below, along with the exploitability and impact sub-scores for each from the NVD.

TABLE 2

| Host | Vulnerability | CVE-ID | Score | Impact Sub-Score | Exploit-ability Sub-Score |
| --- | --- | --- | --- | --- | --- |
| Web Server | Apache Chunked Code | CVE-2002-0392 | 7.5 | 6.4 | 10 |
| File Server | Wuftpd Sockprintf | CVE-2003-1327 | 9.3 | 10 | 8.6 |
| Database | Oracle Tns listener | CVE-2012-1675 | 7.5 | 6.5 | 10 |

Figure 6:
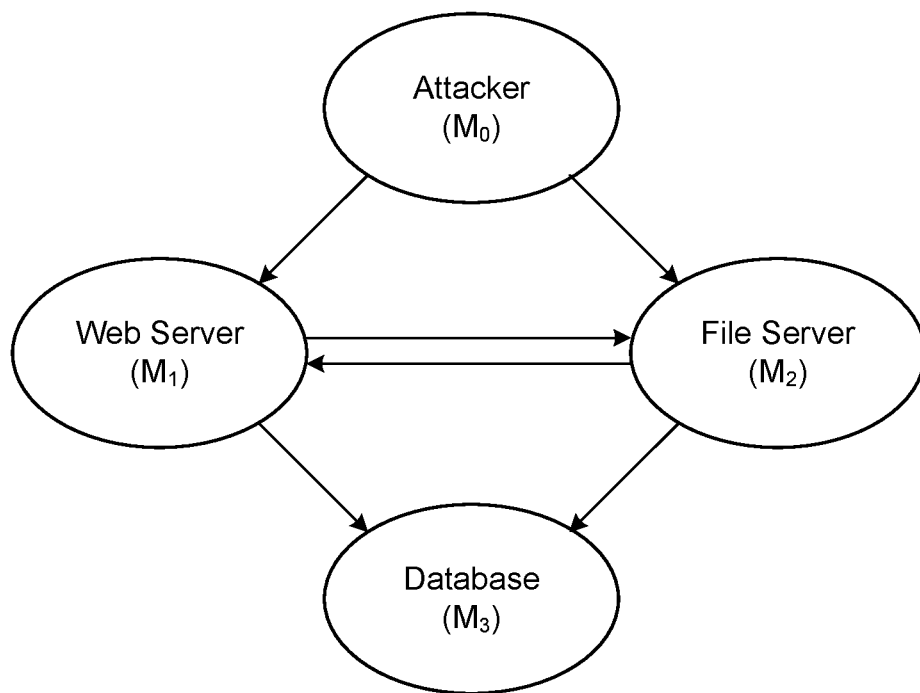
FIG. 6 illustrates an example host access attack graph for the network shown in FIG. 5 according to various examples described herein.

FIG. 6 illustrates a host access attack graph for the network shown in FIG. 5. The attacker 210, web server 202, file server 204, and backend database server 206 are designated $M_0$, $M_1$, $M_2$, and $M_3$, respectively. The connections from all the nodes to the attacker node $M_0$ are omitted to view the graph more clearly.

Applying Equation 5 on the host access attack graph shown in FIG. 6, the weighted adjacency matrix A is:

$$A = \begin{bmatrix} 0 & 8.2 & 9.3 & 0 \\ 1 & 0 & 9.3 & 8.2 \\ 1 & 8.2 & 0 & 8.2 \\ 1 & 0 & 0 & 0 \end{bmatrix}. \qquad (12)$$

The value of the biased factor $\beta$ is assumed to be 0.5 for the example. When the attacker 210 stops attacking due to any unusual circumstances, then the attacker 210 will return to the initial node $M_0$. Hence, the elements of the first column of the weighted adjacency matrix are 1. In other words, the weights of the connections from all host nodes to the attacker node $M_0$ are considered 1, a sure event. The other elements of the weighted adjacency matrix A are calculated using Equation 4. For example, the entry of the first row and second column is $(0.5 \times 10 + 0.5 \times 6.4) = 8.2$. This is the weighted value of the benefit for the attacker 210 to move from node $M_0$ to node $M_1$. The other elements of the weighted adjacency matrix A can be determined similarly.

After the weighted adjacency matrix A is calculated, the elements can be converted into respective probabilities. The entries of the main diagonal are obtained using Equation (8), as:

$$D = \begin{bmatrix} 0.05714 & 0 & 0 & 0 \\ 0 & 0.05405 & 0 & 0 \\ 0 & 0 & 0.05747 & 0 \\ 10 & 0 & 0 & 1 \end{bmatrix} \qquad (13)$$

An element of the first row and the first column of the diagonal matrix is determined as $1/(8.2+9.3) = 0.05714$, and the other elements can be calculated similarly. Using the weighted adjacency matrix A and the diagonal matrix D as shown above, a state transition probability matrix P can be obtained using Equation 7, as:

$$P = \begin{bmatrix} 0 & 0.46857 & 0.5314 & 0 \\ 0.0540 & 0 & 0.5027 & 0.4432 \\ 0.0575 & 0.4712 & 0 & 0.4713 \\ 1 & 0 & 0 & 1 \end{bmatrix} \qquad (14)$$

The value of the first row, second column is 0.46857. That value is representative of the probability that the attacker would move from node $M_0$ to node $M_1$. The other values of in the state transition probability matrix P are representative of the probability that the attacker would move between other nodes (or desirability for the attacker to do so).

The host access attack graph shown in FIG. 6, includes four nodes. Based on the risk ranking algorithm, if there are four nodes then $\frac{1}{4} = 0.25$ is the initial risk of each node, hence an initial risk vector of R=(0.25, 0.25, 0.25, 0.25). When the initial risk vector R and the state transition probability matrix P are iteratively multiplied using Equation 8, convergence is achieved to the values listed in Table 3 below.

TABLE 3

| Node | Risk |
| --- | --- |
| $M_0$ | 0.2609688 |
| $M_1$ | 0.2455964 |
| $M_2$ | 0.2620094 |
| $M_3$ | 0.2314254 |

From Table 3, it is clear that node $M_2$ is more risky than nodes $M_1$ and $M_3$. Thus, the vulnerability of the file server should be patched before those of the other nodes. Further, the total sum of the risk associated with nodes $M_1$, $M_2$, and $M_3$ is as 0.74. This value can be used as a security metric revealing the fact that the network shown in FIG. 6 is not very secure and appropriate actions should be taken.

Figure 7A:
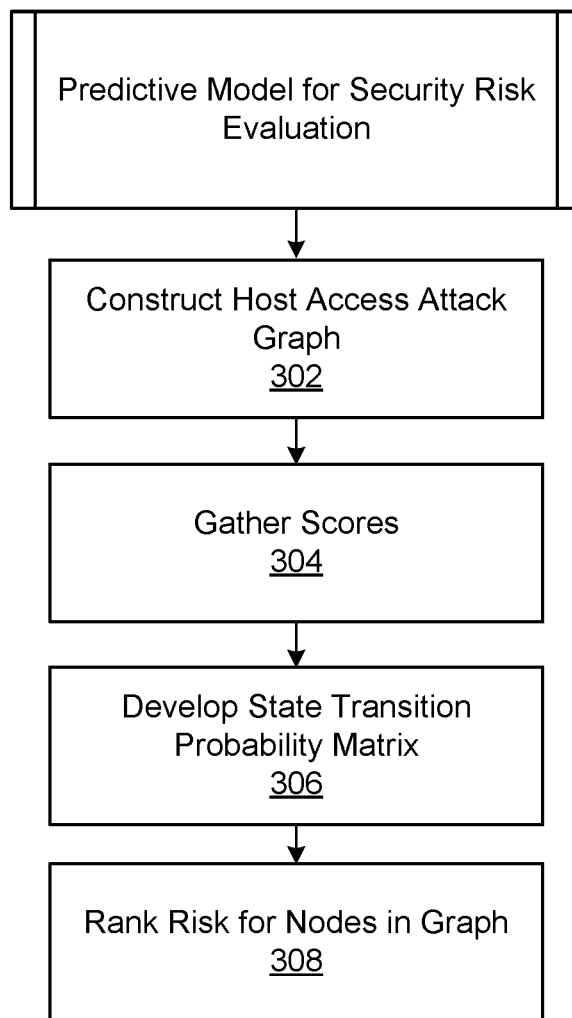
FIG. 7A illustrates a process for a predictive model for security risk evaluation according to various examples described herein.
Figure 7B:
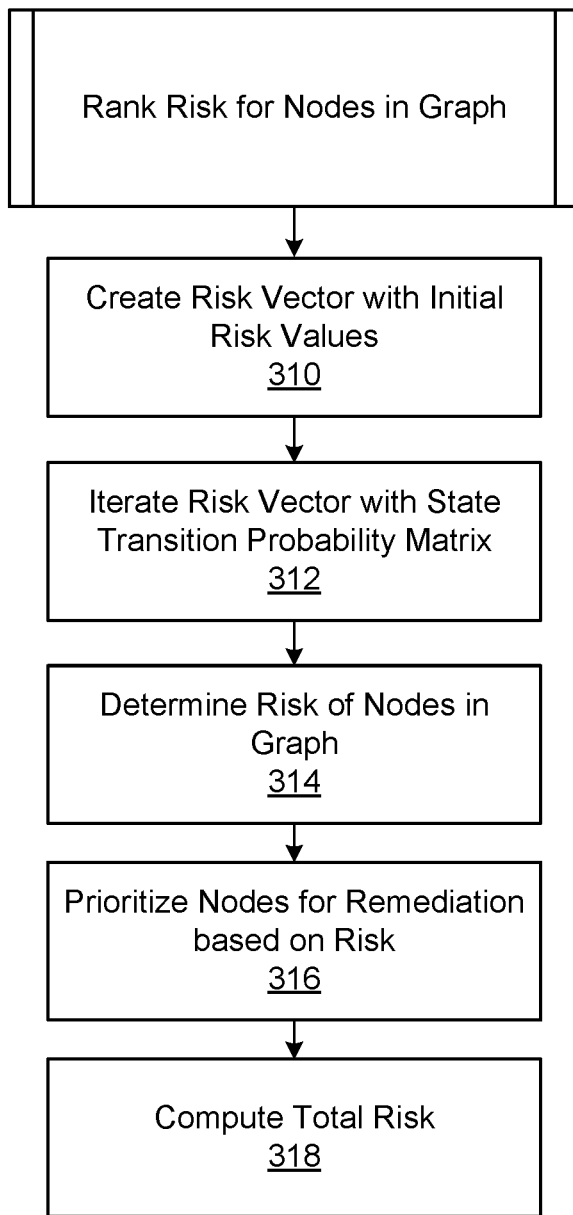
FIG. 7B illustrates a risk ranking algorithm in the process for the predictive model shown in FIG. 7A according to various examples described herein.

FIG. 7A illustrates a process for a predictive model for security risk evaluation, and FIG. 7B further illustrates a risk ranking algorithm in the process shown in FIG. 7A. The process flowcharts in FIGS. 7A and 7B can be viewed as depicting example steps performed by the computing environment 110, although other computing systems and environments can perform the process. The flowcharts in FIGS. 7A and 7B provide merely one example of a functional sequence or arrangement of steps that can be employed to implement the processes for predictive modeling and risk ranking described herein. Although the processes are described in connection with the computing environment 110, other computing environments, systems, and/or devices can perform the processes. Additionally, although not explicitly stated below, among each of the process steps described, any number of intermediate data accessing, storing, and logging steps can be performed.

Turning to FIG. 7A, at step 302, the process can include the attack graph constructor 132 constructing a host access attack graph. The host access attack graph can be constructed based on data stored in the network data 122, for example, according to characteristics of a network of computing systems. The host access attack graph can include a plurality of nodes such as those shown in FIG. 3A or 3B.

At step 304, the process can include the state transition matrix developer 134 gathering security or vulnerability metrics related to one or more of the nodes in the host access attack graph. The metrics may be gathered from the risk metric data 124 or from another computing system via network communications. As one example, the state transition matrix developer 134 can gather exploitability scores and impact scores associated with the nodes in the host access attack graph. The exploitability and impact scores can be CVSS scores or other scores developed according to another vulnerability scoring system.

At step 306, the process can include the state transition matrix developer 134 developing a state transition probability matrix based on the scores gathered at step 304 and the host access attack graph constructed at step 302. In one example, the state transition matrix developer 134 can develop the state transition probability matrix according to Equations (3), (4), (6), (7), and (8) as described above with reference to the exploitability scores and the impact scores.

At step 308, the process can include the risk ranking engine 136 evaluating and ranking risk associated with the nodes in the host access attack graph constructed at step 302 with reference to the state transition probability matrix developed at step 306. The process of evaluating and ranking the risk is illustrated in further detail in FIG. 7B.

Turning to FIG. 7B, the risk ranking process includes creating a risk vector with initial risk values at step 310. As described above, a risk vector R and its initial risk values can be computed based on the number of hosts present in the host access attack graph. If N nodes exist in the host access attack graph, then the rank of all nodes can be equal to 1/N.

At step 312, the process includes the risk ranking engine 136 iterating the risk vector from step 310 with the state transition probability matrix developed at step 306. When the ranking process is started, the intermediate risk value or values are computed via iteration. The intermediate values will flow, level by level, until a steady state is achieved according to Equations (9)-(11) above.

At step 314, it is assumed that the iterating at step 312 has converged, and the risk vector includes a number of risk elements, each representative of the risk of a respective node in the host access attack graph. Using this converged risk vector, the process can include the risk ranking engine 136 prioritizing the risk associated with each node at step 316 by ranking them based on the level of risk of each. In other words, a node associated with a higher level of risk can be prioritized for remediation over a node associated with a relatively lower level of risk.

Finally, at step 318, the process can include the risk ranking engine 136 computing a total risk for the network of computing systems being evaluated. The total risk can be calculated based on a total risk for all the elements in the risk vector, for example. Thus, the risks of all the nodes are summed to give a total security risk present in the network of computing systems.

Thus, as described above, a stochastic model is developed for cybersecurity using a host access attack graph to determine the overall network security risk. The model uses Markov chains in conjunction with CVSS framework metrics to analyze risks associated with structures of various networks. The model can be used to identify critical nodes in the host access attack graph where attackers may be most likely to focus. Based on that information, a network administrator can make appropriate, prioritized decisions for system patching. Further, a flexible risk ranking technique is described, where the decisions made by an attacker can be adjusted using a bias factor. The model can be generalized for use with complicated network environments.

Turning to other embodiments, vulnerabilities are hazardous to the security of a system and make it susceptible to being exploited until patched. Therefore, it is important to address vulnerabilities to the extent possible over time. In that context, a vulnerability life cycle includes information that would be helpful to better understand the vulnerability, its behavior, and the threat it poses with respect to security over time. There are a number of ways to present the life cycle of a particular vulnerability, such as using graphs or charts. While these graphs or charts have certain stages in common, the purpose is to evaluate the level of the risk associated with different stages of a vulnerability over time.

The measurement or evaluation of risk as a probabilistic estimate over time can be challenging. Yet, a method to measure the level of risk associated with a particular vulnerability at a certain time or stage would be helpful to users and organizations. It could help them determine the best time to act, accounting for various priorities. Given a method to measure the level of risk of a number of vulnerabilities over time, organizations can ensure adequate attention and resources are employed to address the risks of the vulnerabilities in the best way, ideally, before they are exploited. In that context, one objective of the embodiments described herein is to obtain a statistical model that can be used to provide the probability of a vulnerability being exploited or patched at a given time. According to the embodiments described herein, Markov chain process theory can be used to develop such a model.

Below, the basic concepts of vulnerability, the vulnerability life cycle, and related technical terms are described. The term vulnerability can be defined as a weakness in a computing system that could allow an attacker to compromise the integrity, availability, or confidentiality of the computing system. A vulnerability can be related to weaknesses in the hardware or software of computing systems.

Figure 8:
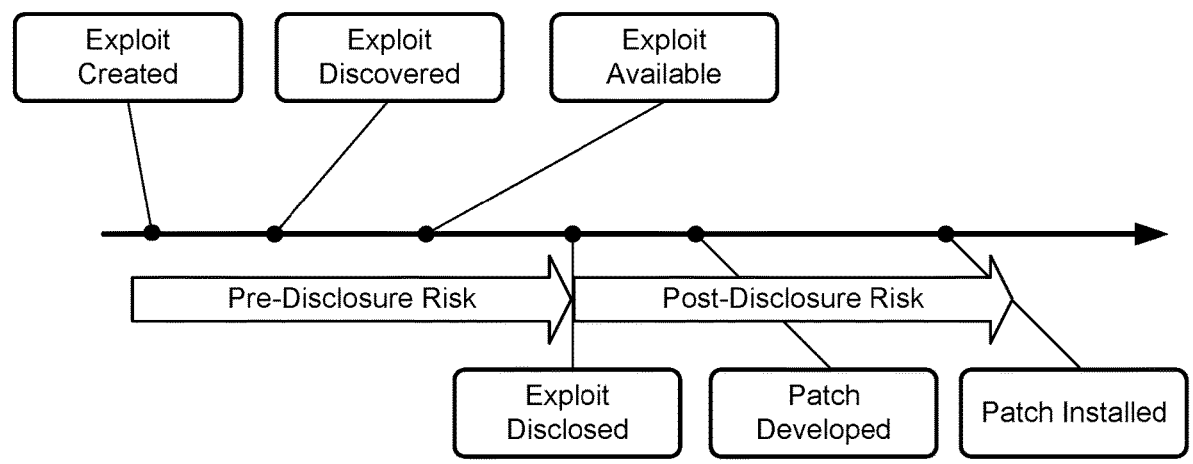
FIG. 8 illustrates an example vulnerability life cycle according to various examples described herein.

FIG. 8 illustrates an example vulnerability life cycle according to various examples described herein. The life cycle of a vulnerability includes a number of different stages. The stages that are commonly identified include the pre-discovery, discovery, disclosure, availability for patching, and availability for exploiting stages. The pre-discovery stage occurs during the development of software, mostly due to a weakness or a mistakes in coding of the software. At this stage, a vulnerability is not yet discovered or exploited.

A vulnerability is discovered once someone identifies it. It is possible that the vulnerability may be discovered by system developers, skilled users, or attackers. If the vulnerability is discovered internally or by white hat researchers (who identify flaws and vulnerabilities with good intentions of helping), it may be fixed as soon as possible. But, if a black hat hacker discovers a vulnerability, it is possible that he or she will try to exploit it, sell knowledge of it on the black market, or distribute it among hackers to be exploited. In other words, when a white hat researcher discovers a vulnerability, the next event is likely to be some disclosure leading to patch development. On the other hand, if a black hat hacker discovers a vulnerability, the next event could be an exploit or internal disclosure to his underground community.

While vulnerabilities exist prior to their discovery, until a vulnerability is discovered, it is typically a smaller security risk. The "time of the discovery" is the earliest time that a vulnerability is identified. In a vulnerability life cycle, the "time of discovery" is an important and event. The exact time of discovery of a vulnerability might not be published or disclosed to the public due to the risks associated with it. However, after the disclosure of the vulnerability, various parties may attempt to exploit it.

In developing the statistical model described herein, the "pre-exploit discovery" can be considered. That is, the model accounts for the chance that a vulnerability is discovered after it is actually exploited. As an example, an attacker could run an exploit attempt aiming for a particular vulnerability, but the exploit might instead break the system through another unidentified or undiscovered vulnerability at that time. While intending to address and incorporate such rare occurrences in future research, vulnerabilities that are discovered before being exploited can be considered.

A vulnerability may be disclosed at any time after it is discovered. Disclosure can take place in different ways based on various factors. In any case, "disclosure" in information security is related to the even through which a particular vulnerability is made known to the public. In general, public disclosure of a vulnerability is based on several principles. The "availability of access" to the vulnerability information for the public is one such important principle. Another important principle is the "validity of information." The validity of information is important to ensure a user's ability to use the information, assess the risk, and take appropriate security measures. Also, the "independence of information channels" is also important to avoid any bias and interferences from organizational bodies including the vendor.

A vulnerability enters to the stage of "exploit availability" from the earliest time that an exploitable vulnerability is available. Once exploits are available, even low skilled crackers (e.g., a black hat hacker) could be capable of exploiting the vulnerability. As described above, there is a chance that an exploit could happen even before the vulnerability is discovered. However, as presented herein, the modelling of vulnerability life cycles with exploit availability generally occurs after discovery.

A patch is a software solution that the vendor or developer releases to provide protection from exploits of a vulnerability. A patch will act against possible exploit codes or attacking attempts for a vulnerability and ensure system integrity. The vulnerability is removed when a security patch is applied to vulnerable systems.

Before turning to a more detailed description of the embodiments, certain terminology is introduced below. As noted above, a host access attack graph can be modeled using a Markov chain with the real behavior of the attacker in conjunction with the Markovian properties. According to the embodiments described below, a vulnerability life cycle graph can also be modeled using a Markov chain. An assumption can also be made that the transition probabilities P of an attack do not depend on time. This is called time homogeneity. The transition probabilities ($P_{i,j}$) for a Markov chain can be defined as follows:

$$P_{i,j}=P\ (X_N=j|X_{N-1}=i). \tag{15}$$

The transition probability matrix P of the Markov chain is the N×N matrix whose (i,j) entry $P_{i,j}$ satisfy the following properties:

$$0 \leq P_{i,j} \leq 1,\ 1 \leq i,j \leq N \tag{16}$$

and $$\sum_{j=1}^{N} P_{ij} = 1,\ 1 \leq i \leq N. \tag{17}$$

Any matrix satisfying Equations (16) and (17) can be a transition matrix for a Markov chain.

To simulate a Markov chain, the matrix P and an initial probability distribution $\pi_o$ are needed. As one example, an N-state Markov chain (X; P; $\pi_0$) for N=0, 1, 2 ... N time periods can be simulated. Let X be a vector of possible state values from sample realizations of the chain. Iterating on the Markov chain will produce a sample path $\{X_N\}$ where, for each N, $X_N \in X$. When writing simulation programs this is about using uniformly distributed U [0, 1] random numbers to obtain the corrected distribution in every step.

As for transient states, let P be the transition matrix for the Markov chain $X_n$. A "state i" is called transient state if with probability 1 the chain visits i only a finite number of times. Let Q be the sub matrix of P which includes only the rows and columns for the transient states. The transition matrix for an absorbing Markov chain has the following canonical form:

$$P = \begin{pmatrix} Q & R \\ 0 & I \end{pmatrix}. \tag{18}$$

In Equation (18), P is the transition matrix, Q is the matrix of transient states, R is the matrix of absorbing states, and I is the identity matrix.

The transition matrix P represents the transition probability matrix of the absorbing Markov chain. In an absorbing Markov chain, the probability that the chain will be absorbed is always 1. Hence:

$$Q^n \to 0 \text{ as } n \to \infty. \qquad (19)$$

Thus, this implies that all the eigenvalues of Q have absolute values strictly less than 1. Hence, I–Q is an invertible matrix and there is no problem in defining is as:

$$M=(I-Q)^{-1}=I+Q+Q^2+Q^3+ \qquad (20)$$

This matrix is called the fundamental matrix of P. Let i be a transient state and consider $Y_i$, the total number of visits to i. Then, the expected number of visits to i starting at j is given by $M_{ji}$, the (i,j) entry of the matrix M. Therefore, to compute the expected number of steps until the chain enters a recurrent class, assuming starting at state j, only sum $M_{ji}$ over all transient states i.

Figure 9:
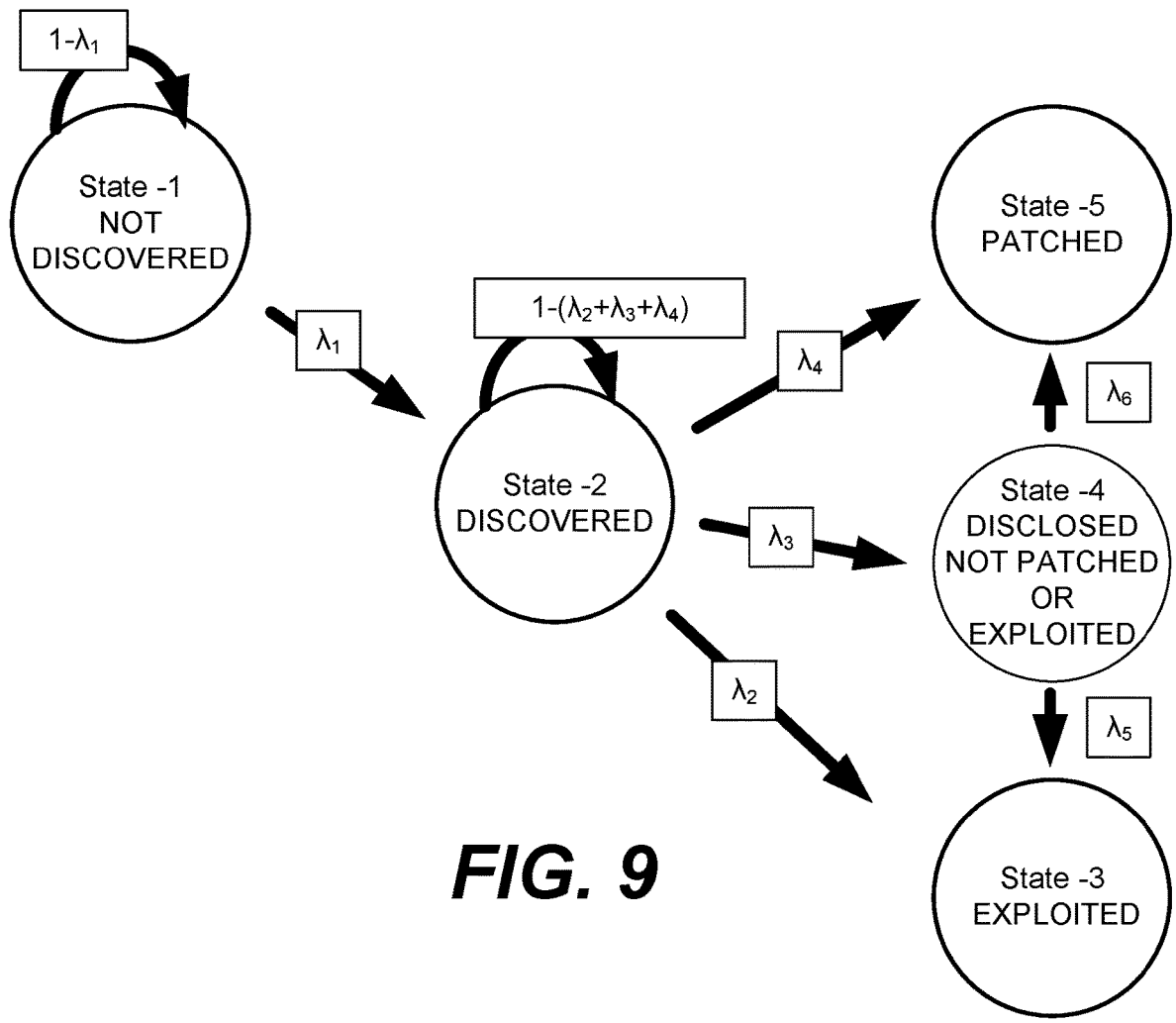
FIG. 9 illustrates an example vulnerability life cycle graph including five states according to various examples described herein.

One core component of the vulnerability life cycle analysis described herein is the life cycle graph. A vulnerability life cycle graph for a given vulnerability has several state nodes, each representative of a state of a vulnerability in a computing system. FIG. 9 illustrates an example vulnerability life cycle graph including five states according to various examples described herein. The life cycle graph shown in FIG. 9 can be constructed by the life cycle graph constructor 138 of the computing environment 110 shown in FIG. 2, for example. The vulnerability life cycle graph can be generated based on the network data 122 and/or the risk metric data 124.

Once the vulnerability life cycle graph is constructed, the life cycle graph constructor 138 and/or the absorbing transition probability matrix developer 140 can assign initial probabilities (i.e., each $\lambda_i$) for the different states in the life cycle graph. Developing or estimating these initial probabilities can require a significant amount of data resources. To estimate $\lambda_1$, for example, any of the total number of vulnerabilities in each category of a computing system could be considered, each ranging from 0 to 10 in magnitude, for example, along with information related to their discovery with respect to time. Similarly, for the other states, the number of vulnerabilities discovered, exploited before disclosed, exploited after discovery but before patched, patched before disclosure, and patched after disclosure can be relied upon under each CVSS score level.

As one example, the absorbing transition probability matrix developer 140 is configured to reference the CVSS scores available for each category of vulnerability. However, CVSS scores may not be available to provide data for all cases. Thus, the absorbing transition probability matrix developer 140 can reference the CVSS classifications available in the CVE detail website where available, and other resources of information can be used in some cases. Examples of the other resources include industry reports, thesis papers, and other resources of data on vulnerabilities.

TABLE 4

States Represented by the Transition
Probabilities in the Vulnerability
Life Cycle

| Probability-$\lambda_i$, | State Represented |
| --- | --- |
| $\lambda_1$ | Discovered |
| $\lambda_2$ | Exploited before patched or disclosed |

TABLE 4-continued

States Represented by the Transition
Probabilities in the Vulnerability
Life Cycle

| Probability-$\lambda_i$, | State Represented |
| --- | --- |
| $\lambda_3$ | Disclosed but not yet patched or exploited |
| $\lambda_4$ | Patched before disclosed |
| $\lambda_5$ | Exploited after disclosed |
| $\lambda_6$ | Patched after disclosed |

Data from other resources can also be used to assign probabilities for the disclosed but not yet patched or exploited state ($\lambda_3$), the patched before disclosed state ($\lambda_4$), the exploited after disclosed ($\lambda_5$) state, and the patched after disclosed ($\lambda_6$) state.

To calculate an estimate for $\lambda_1$ (e.g., "the probability of a vulnerability is being discovered") for three categories of CVSS scores, it is helpful to have an estimate for the population of a "total number of (known and unknown) vulnerabilities at a particular time" to get the proportion of discovered vulnerability out of the total. But, at a given time, it may not be possible to know the total number of vulnerabilities in computing systems as the number of vendors, application software, system software, and other apps are undefined.

To have a logical estimate for the total number of vulnerabilities for each year, the absorbing transition probability matrix developer 140 can also estimate a cumulative number of vulnerabilities in the computing system being modeled. Then, the number of vulnerabilities discovered in a particular year as a proportion of the cumulative number of vulnerabilities in the next calendar year can also be calculated. Once these proportions are calculated, the average of those proportions can be used as the estimate for $\lambda_1$. When calculating $\lambda_1$, it can be assumed that a number of unknown vulnerabilities in a particular year are discovered in the next year, and the accumulated number of vulnerabilities in a particular year is an estimate for the population size of the vulnerabilities in the previous year.

To calculate an estimate for $\lambda_2$ (e.g., "the probability of a particular vulnerability being exploited before patched or disclosed"), the data provided in the CVE website can be used, although other sources can be relied upon. The entire set of exploited vulnerabilities can be calculated for 10 different categories (or CVSS score levels) of interest, for example. Alternatively, to calculate an estimate for $\lambda_2$, the equation $\lambda_2=1-(\lambda_2+\lambda_3+\lambda_4)$ can be used, among other methods. To calculate an estimate for $\lambda_3$, the equation $\lambda_3=1-(\lambda_2+\lambda_4)$ can be used, among other methods. To calculate estimates for $\lambda_4$, $\lambda_5$, and $\lambda_6$, information available from other resources can be used. One example resource estimates the probability of a vulnerability being exploited after being disclosed is greater than the probability of it being patched. The resource estimates that there is a probability of about 0.6 for a disclosed vulnerability being exploited. Thus, in one case, fixed values of 0.6 and 0.4, respectively, can be used for $\lambda_5$ and $\lambda_6$.

Thus, the probabilities for a hacker to reach each state node in the vulnerability life cycle graph shown in FIG. 9 can be assigned to each state by the life cycle graph constructor 138 and/or the absorbing transition probability matrix developer 140 by examining the properties of specific vulnerabilities in the computing system or systems being modeled. The vulnerability life cycle graph shown in FIG. 9 has two absorbing state nodes, called the patched state node and the exploited state node. These states allow the vulnerability life cycle graph to be modeled as an absorbing Markov chain. FIG. 9 shows states three and five as the absorbing states of the life cycle graph, where state three is the "exploited" state and state five is the "patched" state.

$\lambda_i$ is defined as the probability of transferring from state i to state j, where, i, j=1, 2, 3, 4, 5. In actual situations, the probability of discovering a vulnerability can be assumed to be very small. Therefore, as a starting point in one example, a small value can be assigned for $\lambda_1$. The probabilities for $\lambda_1$, $\lambda_2$, $\lambda_3$, $\lambda_4$, $\lambda_5$ can then be assigned accordingly. Checking for several random values of $\lambda_i$, the behavior of the other states can be observed as a function of time. Using the transition probabilities, the absorbing transition probability matrix can be derived, which follows the properties defined under the Markov chain transformation probability method.

Using the probabilities for a hacker to reach each state node, the absorbing transition probability matrix developer 140 is configured develop the absorbing transition probability matrix for a vulnerability life cycle according to the Markov process described above. For example, the transition probability matrix P for the vulnerability life cycle can be written as follows:

$$P = \begin{bmatrix} 1-\lambda_1 & \lambda_1 & 0 & 0 & 0 \\ 0 & 1-(\lambda_2+\lambda_3+\lambda_4) & \lambda_2 & \lambda_3 & \lambda_4 \\ 0 & 0 & 1 & 0 & 0 \\ 0 & 0 & \lambda_5 & 0 & \lambda_6 \\ 0 & 0 & 0 & 0 & 1 \end{bmatrix}, \quad (21)$$

Where $P_i(t)$ is the probability that the system is in state i at time t. For t=0, $P_1(0)$ is 1, the probability that the system is in state 1 at the beginning (t=0), $P_2(0)$=0, $P_3(0)$=0, $P_4(0)$=0, and $P_5(0)$=0. Therefore, the initial probability can be given as [1 0 0 0 0], that is, the probabilities of each state of the vulnerability life cycle initially. The state 1 (i.e., not discovered) with probability of one represents that, at the initial time (for t=0), the vulnerability has not yet been discovered. Therefore, the probabilities for all others stages are zero.

The transition probability matrix P can then be iterated by the absorbing transition probability matrix developer 140 using the Markovian process until it reaches its "steady state". For t=0, $\vec{P^{(0)}}$=[1 0 0 0 0]. For t=1, results in $\vec{P^{(1)}}=\vec{P^{(0)}}P$. For t=2, $\vec{P^{(2)}}=\vec{P^{(0)}}P^{(2)}$. Thus, for=n, $\vec{P^{(n)}}=\vec{P^{(0)}}P^{(n)}$. Using this method, the probability is changing with time and is related to each "state," and it is also possible to find a statistical model that can fit the vulnerability life cycle.

As an example, for $\lambda_1$=0.1, $\lambda_2$=0.2, $\lambda_3$=0.3, $\lambda_4$=0.4, $\lambda_5$=0.4, and $\lambda_6$=0.6, the transition probability matrix can be written as follows:

$$P = \begin{bmatrix} 0.9 & 0.1 & 0 & 0 & 0 \\ 0 & 0.1 & 0.2 & 0.3 & 0.4 \\ 0 & 0 & 1 & 0 & 0 \\ 0 & 0 & 0.4 & 0 & 0.6 \\ 0 & 0 & 0 & 0 & 1 \end{bmatrix}. \quad (22)$$

As this transition probability matrix is iterated, stationarity was reached (considering to 4 decimal digits) at t=107.

That is, at t=107, the minimum number of steps until the vulnerability reaches an absorbing state was found and the resulting vector of probabilities for each of the states was obtained. As the row vector shows, the transition probabilities are completely absorbed into the two absorbing states. This gives the probability of the vulnerability being exploited and the probability of the vulnerability being patched. The number of steps is related to the particular time at which the transition probabilities are absorbed into one or both of the two absorbing states, and all other states have reached the probability of zero. In this example case, $P^{(n)} = P^{(0)}P^{(n)}$[0 0 0.3556 0 0.6444].

Figure 10:
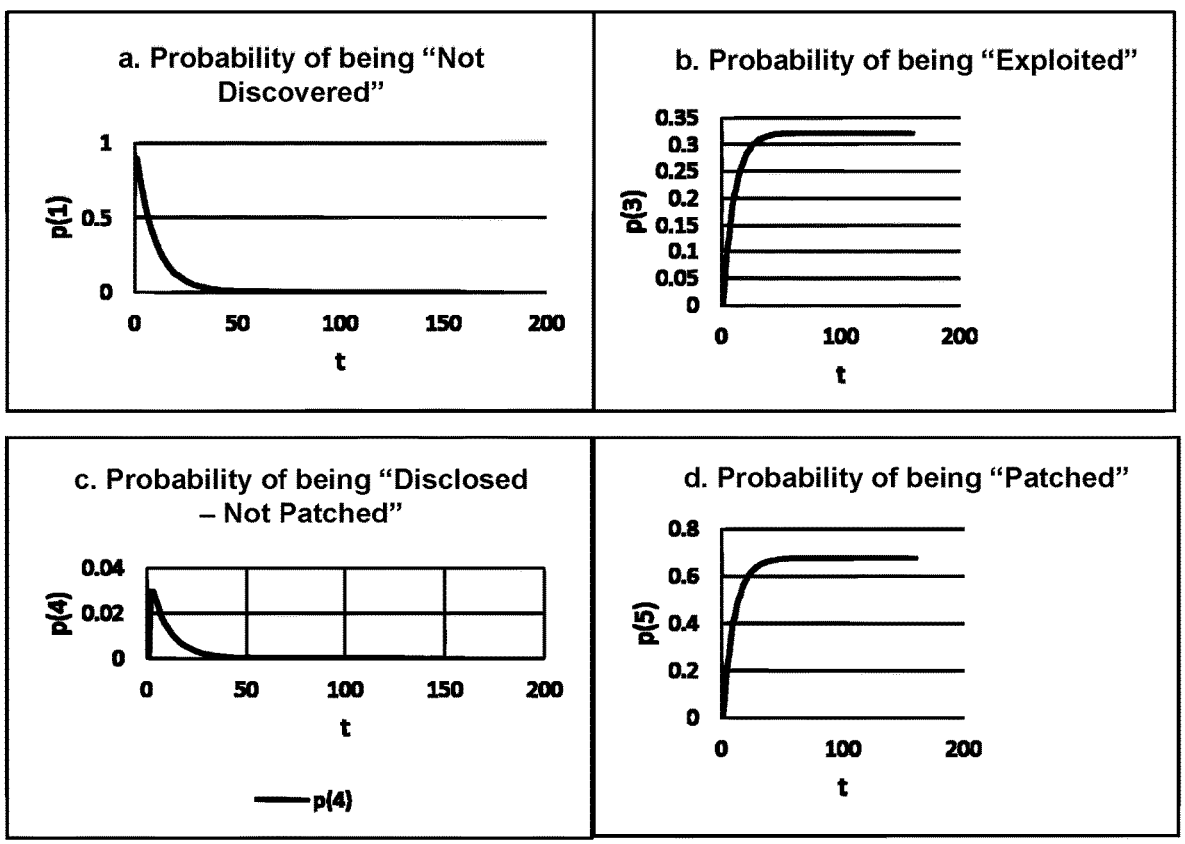
FIG. 10 illustrates the probability of different states in the vulnerability life cycle graph shown in FIG. 9 as a function of time according to various examples described herein.

FIG. 10 illustrates the probability of different states in the vulnerability life cycle graph shown in FIG. 9 as a function of time. For states one, three, four, and five, taking initial probabilities as mentioned above, the behavior as a function of time is graphed. For states one and three, the probability of "not-discovered" and "disclosed not patched," respectively, decreases with respect to time and eventually approaches zero. This indicates that the probability of a vulnerability being "not-discovered" over the time is decreasing and eventually reaches zero at the time of the "discovery" as shown in panel (a) in FIG. 10.

Once a vulnerability is discovered, the probability of being "exploited" increases over time as shown in panel (b) in FIG. 10. And, as system security activities may also take place over time, the probability of being "patched" also increases over time as shown in panel (d) in FIG. 10. There is also a time gap between the disclosure and patching of the vulnerability. Initially, the probability of the vulnerability being "disclosed not patched" rises for a short period of time and then decreases eventually, as shown in panel (c) in FIG. 10.

Figure 11A:
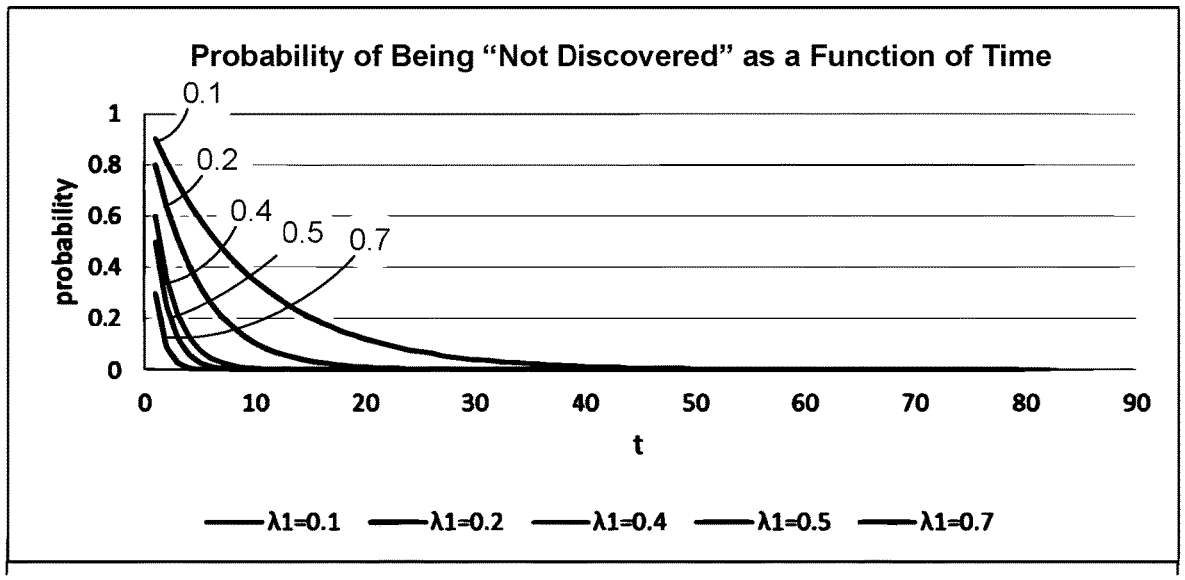
FIGS. 11A-11D illustrate changes in the behavior of various states over time according to various examples described herein.
Figure 11B:
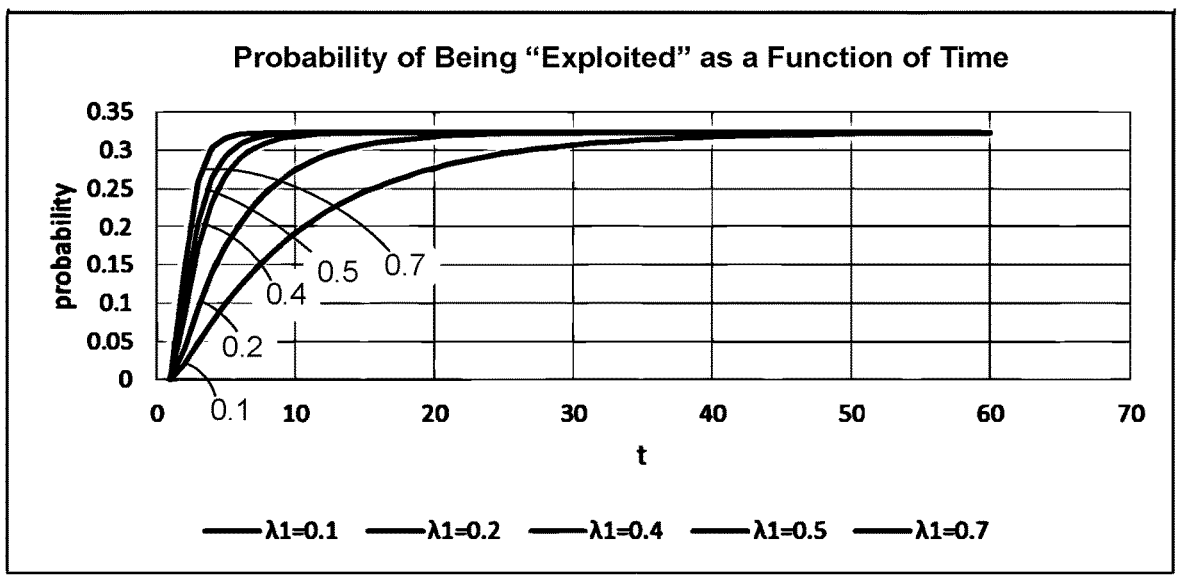
Figure 11C:
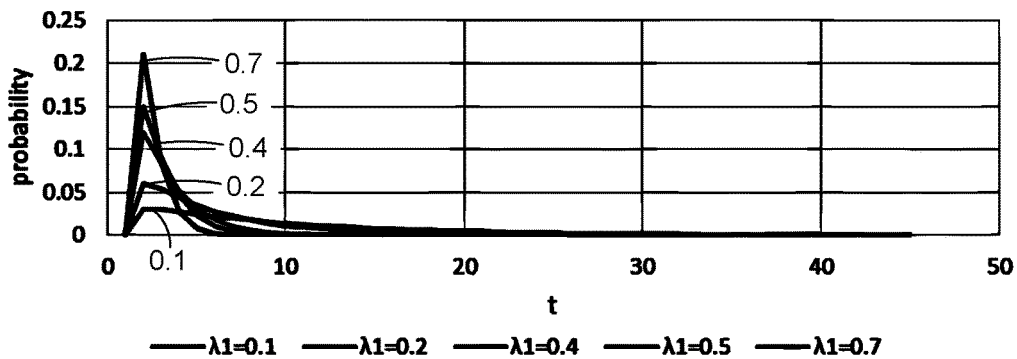
Figure 11D:
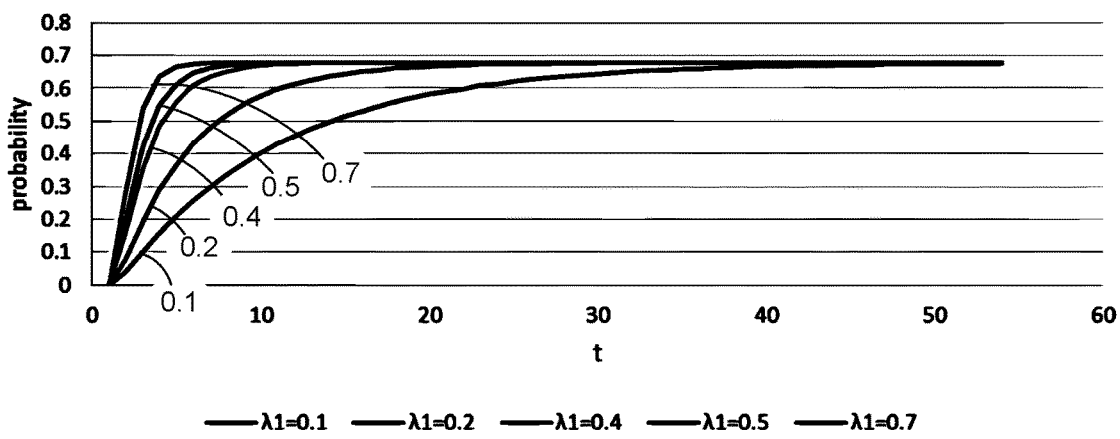

For a better understanding, comparison, and for a more generalized observation, the behavior of these probabilities can be checked over the time with different assigned values of initial probability. For example, the value of $\lambda_1$ can be changed to compare the probability changes in each state with time. FIGS. 11A-4D illustrate the changes in the behavior of each state for $\lambda_1$=0.1, 0.2, 0.4, 0.5, and 0.7.

As shown among FIGS. 11A-4D, the initial probability assigned for $\lambda_1$ does not alter the behavior of the probability over time. However, a vulnerability with a higher initial probability of being "discovered" will go to stationarity faster than those with a lower initial probability of being "discovered". This is observable in FIGS. 11A and 11, respectively.

Vulnerabilities which have been discovered but not patched represent a security risk which can lead to considerable financial damage, loss of reputation, or credibility. Therefore, estimating the risk is important and the embodiments described herein introduce a method to evaluate the risk level of discovered vulnerabilities.

By examining FIG. 10, related to the state "exploited" in the vulnerability life cycle, a pattern of exploitability as a function of time can be seen. As a function of time, the probability of being exploited increases significantly up to some stage and then eventually becomes stable. To evaluate the risk factor of exploiting with respect to time, the changes in the initial probabilities and also the CVSS scores of vulnerabilities can be considered.

As a more particular example, let $v_i$ be any specific vulnerability, and the risk factor can be defined as follows:

$v_i(t)$ is $Pr$ ($v_i$ is in state 3 at time $t$)×Exploitability score ($v_i$). (23)

This definition of the risk factor in Equation (23) can used in developing the statistical model to evaluate the risk behavior.

To accomplish this objective, the model developer 142 can be configured to develop two statistical models where the response variable Y is the probability of being exploited and is driven by the attributable variable t, the time. At first, for statistical accuracy to homogenize the variance, the data can be filtered using the natural logarithm t. For the second model, to obtain a better fit to the data, a term with an inverse transformation can be introduced in addition to the filter using the natural logarithm. Thus, the proposed final forms of the statistical model to estimate the probability of being exploited at time t is given in Table 5 below.

For $\lambda_1=0.1$, $\lambda_2=0.2$, $\lambda_3=0.3$, $\lambda_4=0.4$, $\lambda_5=0.4$, and $\lambda_6=0.6$ values, a model was proposed to predict the probability at different time intervals as shown in Table 5.

TABLE 5

Proposed Models for Estimating
Probability of Being Exploited at Time t

| Model | $R^2$ | $R^2_{adj}$ |
|---|---|---|
| Y = 0.0868 + 0.0523ln(t) | 0.7544 | 0.7528 |
| Y = 0.1772 − 0.27189(1/t) + 0.0326 ln(t) | 0.8526 | 0.8507 |

As an example, a specific vulnerability labeled as CVE-2016-0467 can be considered. This has a CVSS base score of 4.00, categorized as a medium score with "impact sub score: 2.9" and "exploitability sub score: 8.0." For this vulnerability, the risk can be measured as follows:

Risk for exploit $(t)$=$Pr$ ($v_i$ is in state 3 at time $t$)×Exploitability score $(v_i)$=(0.1772−0.27189(1/$t$)+ 0.0326 ln($t$)×8. (24)

Using Equation (24) above, the risk factor of a specific vulnerability at any time interval can be predicted. Table 5 provides a good model that gives an $R^2$ of 0.8526 and $R^2_{adj}$ of 0.8507. $R^2$ relates how much the change in the response variable can be predicted by the attributable variables of the model and considered as the key criterion in evaluating the quality of a model. In other words, $R^2$ equals to the ratio of the Sum of Squares of the Regression to the Total Sum of Squares. That is, $$R^2 = \frac{SS_{Reg}}{SS_{Total}} = 1 - \frac{SSS_{Res}}{SSS_{Total}}. \quad (25)$$

Both $R^2$ and $R^2_{adj}$ attest to the quality of the model. The closer the values are to 1, the better the prediction realizes from the analytical model. $R^2_{adj}$ tracks the quality of $R^2$, such that the closer the $R^2_{adj}$ is to $R^2$, the better the quality of the model that is being identified through the validation process. For example, if $R^2$ is 0.95, the model is at least 95% accurate in making predictions from the analytical form.

For the given values for $\lambda_1$ to $\lambda_6$ given above, consider the values of the response variable Y (Probability of being exploited) at several values of time t. Table 6 illustrates several results obtained, and the Sum of Squared Error for the model can be obtained using such data.

TABLE 6

Probabilities Estimated Using Two
Models for Several t

| T | Model 1 Estimate | Model 2 Estimate |
|---|---|---|
| 1 | 0.0868 | −0.09469 |
| 2 | 0.123051598 | 0.063851598 |
| 3 | 0.144257423 | 0.122384761 |
| 18 | 0.237966443 | 0.256321119 |
| 19 | 0.240794159 | 0.258878711 |
| 20 | 0.243476798 | 0.261266372 |
| 28 | 0.261074296 | 0.27611951 |
| 29 | 0.262909572 | 0.277598327 |
| 30 | 0.264682623 | 0.279016035 |
| 58 | 0.299161169 | 0.304882684 |
| 59 | 0.300055208 | 0.305519416 |
| 60 | 0.300934221 | 0.306144133 |
| 88 | 0.320964715 | 0.320071521 |
| 89 | 0.321555682 | 0.320474602 |
| 90 | 0.322140046 | 0.320872795 |
| 98 | 0.326593799 | 0.323895552 |
| 99 | 0.327124768 | 0.324254543 |
| 100 | 0.327650401 | 0.324609648 |

While the second model qualifies better, as $R^2$ is higher as compared to the first model, it should be noted that the comparison with respect to the probability of being exploited is in comparison with the probability obtained from the transition metrics for a particular time t.

The model developer 142 can be configured to generate different models for different vulnerabilities involving different CVSS scores. In that way, the model developer 142 can generate different models to improve the prediction of probabilities with respect to critical stages in the vulnerability life cycle of a particular vulnerability.

Using the Markov model approach to the vulnerability life cycle, it is possible to have a better understanding of the behavior of a vulnerability as a function time. According to the embodiments, a statistical model is developed to estimate the probability of being in a certain stage of a particular vulnerability in its life cycle. The methodology with the application of Markov chain theory gives the basis for calculating estimates for probabilities for different stages of a life cycle of the vulnerability considered. Using the developed method, it is possible to evaluate the risk level of a particular vulnerability at a certain time. These developments allow an advantage in taking measures to avoid exploitations and introduce patches for the vulnerability before an attacker takes the advantage of that particular vulnerability.

Figure 12:
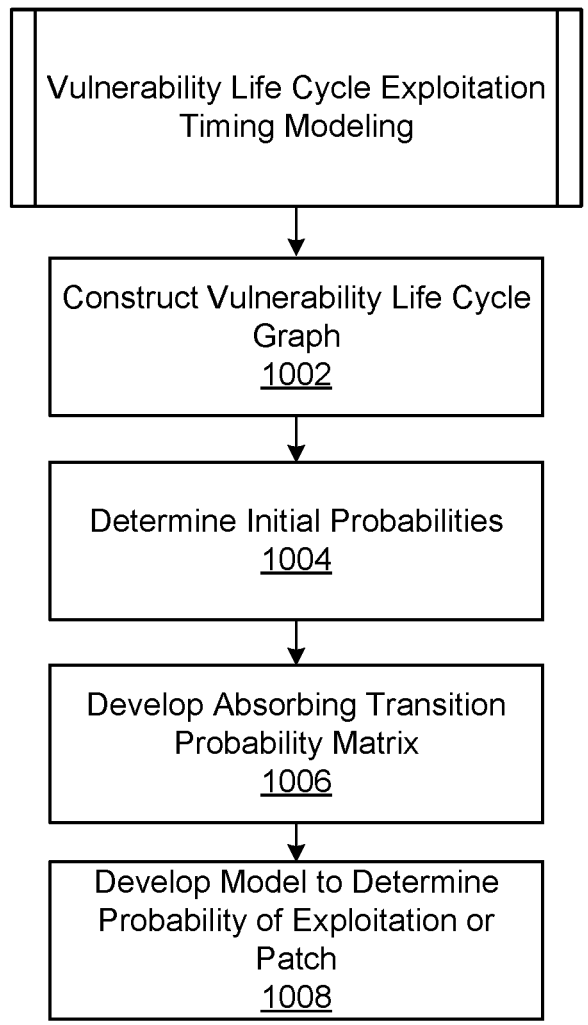
FIG. 12 illustrates a process for vulnerability life cycle exploitation timing modeling according to various examples described herein.

FIG. 12 illustrates a process for vulnerability life cycle exploitation timing modeling according to various examples described herein. The process flowchart in FIG. 12 can be viewed as depicting example steps performed by the computing environment 110, although other computing systems and environments can perform the process. The flowchart in FIG. 12 provides merely one example of a functional sequence or arrangement of steps that can be employed to develop a model for predicting exploitability as described herein, and other sequences can be relied upon. Although the process is described in connection with the computing environment 110, other computing environments, systems, and/or devices can perform the process. Additionally, although not explicitly stated below, among each of the process steps described, any number of intermediate data accessing, storing, and logging steps can be performed.

Turning to FIG. 12, at step 1002, the process can include the life cycle graph constructor 138 constructing a vulnerability life cycle graph as described herein. The vulnerability life cycle graph can include a number of state nodes each representative of a state of a vulnerability in a computing system as shown in FIG. 9, for example. The life cycle graph can be constructed based on data stored in the network data 122, for example, according to characteristics of one or a network of computing systems.

At step 1004, the process can include the life cycle graph constructor 138 and/or the absorbing state probability matrix developer 140 determining initial probabilities of at least one state node among the state nodes in the life cycle graph constructed at step 1002. These initial probabilities can be determined based on data stored in the network data 122, the risk metric data 124, and/or other data. To estimate $\lambda_1$, for example, the absorbing state probability matrix developer 140 can include any number of the total number of vulnerabilities in each category of a computing system, each ranging from 0 to 10 in magnitudes, for example, along with information related to their discovery with respect to time. Similarly, for the other states, the number of vulnerabilities discovered, exploited before disclosed, exploited after discovery but before patched, patched before disclosure, and patched after disclosure can be relied upon under each CVSS score level.

The life cycle graph constructor 138 and/or the absorbing transition probability matrix developer 140 can reference the CVSS scores available for each vulnerability for the discovered, patched, and exploited states. The absorbing transition probability matrix developer 140 can also reference the CVSS classifications available in the CVE detail website where available, and other information can be used in some cases. Examples of the other information include that provided in various vulnerability reports, such as the information given by the Stefan Frei and/or the Secunia Vulnerability information report, among others.

At step 1006, the process can include the absorbing state probability matrix developer 140 developing an absorbing transition probability matrix based on the vulnerability life cycle graph and the initial probabilities determined at step 1004 as described above. The process can also include iterating the absorbing transition probability matrix over a number of cycles until the absorbing transition probability matrix reaches a steady state, where the number of cycles is representative of a period of time.

At step 1008, the process can include the model developer 142 developing a model to determine a probability metric of the vulnerability being exploited or a probability metric of the vulnerability being patched based on the steady state information obtained from step 1006. Particularly, the steady state information from step 1006 can be used to develop a statistical model for each category of vulnerability to predict the probability of being exploited as a function of time. The models can be non-linear models. The steady state information can also be used to develop a statistical model for each category of vulnerability to predict the probability of being patched as a function of time. The general analytical form of the model or models can be similar to those described above. The models can include separate models developed by the model developer 142 for low, medium, and high vulnerability categories as described above. The models can be used to determine a probability of various vulnerabilities of the computing system being exploited at a particular time.

Figure 13:
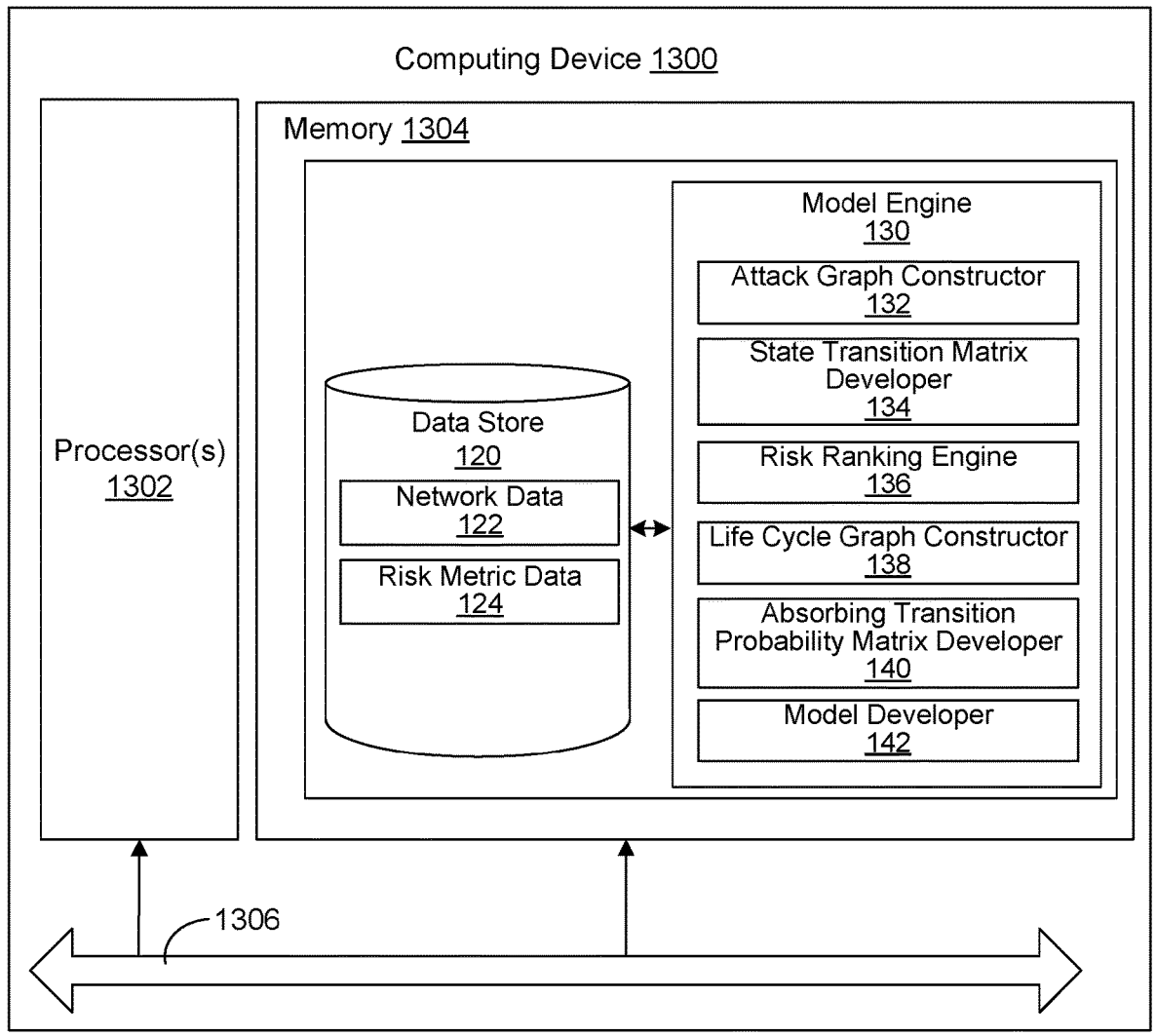
FIG. 13 illustrates an example schematic block diagram of a computing device for the computing environment shown in FIG. 2 according to various embodiments described herein.

FIG. 13 illustrates an example schematic block diagram of a computing device 1300 for the computing environment 110 shown in FIG. 2 according to various embodiments described herein. The computing device 1300 includes at least one processing system, for example, having a processor 1302 and a memory 1304, both of which are electrically and communicatively coupled to a local interface 1306. The local interface 1306 can be embodied as a data bus with an accompanying address/control bus or other addressing, control, and/or command lines.

In various embodiments, the memory 1304 stores data and software or executable-code components executable by the processor 1302. For example, the memory 1304 can store executable-code components associated with the model engine 130 for execution by the processor 1302. The memory 1304 can also store data such as that stored in the data store 120, among other data.

It is noted that the memory 1304 can store other executable-code components for execution by the processor 1302. For example, an operating system can be stored in the memory 1304 for execution by the processor 1302. Where any component discussed herein is implemented in the form of software, any one of a number of programming languages can be employed such as, for example, C, C++, C#, Objective C, JAVA®, JAVASCRIPT®, Perl, PHP, VISUAL BASIC®, PYTHON®, RUBY, FLASH®, or other programming languages.

As discussed above, in various embodiments, the memory 1304 stores software for execution by the processor 1302. In this respect, the terms "executable" or "for execution" refer to software forms that can ultimately be run or executed by the processor 1302, whether in source, object, machine, or other form. Examples of executable programs include, for example, a compiled program that can be translated into a machine code format and loaded into a random access portion of the memory 1304 and executed by the processor 1302, source code that can be expressed in an object code format and loaded into a random access portion of the memory 1304 and executed by the processor 1302, or source code that can be interpreted by another executable program to generate instructions in a random access portion of the memory 1304 and executed by the processor 1302, etc.

An executable program can be stored in any portion or component of the memory 1304 including, for example, a random access memory (RAM), read-only memory (ROM), magnetic or other hard disk drive, solid-state, semiconductor, universal serial bus (USB) flash drive, memory card, optical disc (e.g., compact disc (CD) or digital versatile disc (DVD)), floppy disk, magnetic tape, or other types of memory devices.

In various embodiments, the memory 1304 can include both volatile and nonvolatile memory and data storage components. Volatile components are those that do not retain data values upon loss of power. Nonvolatile components are those that retain data upon a loss of power. Thus, the memory 1304 can include, for example, a RAM, ROM, magnetic or other hard disk drive, solid-state, semiconductor, or similar drive, USB flash drive, memory card accessed via a memory card reader, floppy disk accessed via an associated floppy disk drive, optical disc accessed via an optical disc drive, magnetic tape accessed via an appropriate tape drive, and/or other memory component, or any combination thereof. In addition, the RAM can include, for example, a static random access memory (SRAM), dynamic random access memory (DRAM), or magnetic random access memory (MRAM), and/or other similar memory device. The ROM can include, for example, a programmable read-only memory (PROM), erasable programmable read-only memory (EPROM), electrically erasable programmable read-only memory (EEPROM), or other similar memory device.

The processor 1302 can be embodied as one or more processors 1302 and the memory 1304 can be embodied as one or more memories 1304 that operate in parallel, respectively, or in combination. Thus, the local interface 1306 facilitates communication between any two of the multiple processors 1302, between any processor 1302 and any of the memories 1304, or between any two of the memories 1304, etc. The local interface 1306 can include additional systems designed to coordinate this communication, including, for example, a load balancer that performs load balancing.

As discussed above, the model engine 130, and the components thereof, can be embodied, at least in part, by software or executable-code components for execution by general purpose hardware. Alternatively the same can be embodied in dedicated hardware or a combination of software, general, specific, and/or dedicated purpose hardware. If embodied in such hardware, each can be implemented as a circuit or state machine, for example, that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc.

The flowchart or process diagrams in FIGS. 7A, 7B, and 12 are representative of certain processes, functionality, and operations of the embodiments discussed herein. Each block can represent one or a combination of steps or executions in a process. Alternatively or additionally, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as the processor 1102. The machine code can be converted from the source code, etc. Further, each block can represent, or be connected with, a circuit or a number of interconnected circuits to implement a certain logical function or process step.

Although the flowchart or process diagrams in FIGS. 7A, 7B, and 12 illustrate a specific order, it is understood that the order can differ from that which is depicted. For example, an order of execution of two or more blocks can be scrambled relative to the order shown. Also, two or more blocks shown in succession can be executed concurrently or with partial concurrence. Further, in some embodiments, one or more of the blocks can be skipped or omitted. In addition, any number of counters, state variables, warning semaphores, or messages might be added to the logical flow described herein, for purposes of enhanced utility, accounting, performance measurement, or providing troubleshooting aids, etc. Such variations, as understood for implementing the process consistent with the concepts described herein, are within the scope of the embodiments.

Also, any logic or application described herein, including the model engine 130 that are embodied, at least in part, by software or executable-code components, can be embodied or stored in any tangible or non-transitory computer-readable medium or device for execution by an instruction execution system such as a general purpose processor. In this sense, the logic can be embodied as, for example, software or executable-code components that can be fetched from the computer-readable medium and executed by the instruction execution system. Thus, the instruction execution system can be directed by execution of the instructions to perform certain processes such as those illustrated in FIGS. 7A, 7B, and 12. In the context of the present disclosure, a non-transitory computer-readable medium can be any tangible medium that can contain, store, or maintain any logic, application, software, or executable-code component described herein for use by or in connection with an instruction execution system.

The computer-readable medium can include any physical media such as, for example, magnetic, optical, or semiconductor media. More specific examples of suitable computer-readable media include, but are not limited to, magnetic tapes, magnetic floppy diskettes, magnetic hard drives, memory cards, solid-state drives, USB flash drives, or optical discs. Also, the computer-readable medium can include a RAM including, for example, an SRAM, DRAM, or MRAM. In addition, the computer-readable medium can include a ROM, a PROM, an EPROM, an EEPROM, or other similar memory device.

Disjunctive language, such as the phrase "at least one of X, Y, or Z," unless specifically stated otherwise, is to be understood with the context as used in general to present that an item, term, etc., can be either X, Y, or Z, or any combination thereof (e.g., X, Y, and/or Z). Thus, such disjunctive language is not generally intended to, and should not, imply that certain embodiments require at least one of X, at least one of Y, or at least one of Z to be each present.

It should be emphasized that the above-described embodiments of the present disclosure are merely possible examples of implementations set forth for a clear understanding of the principles of the disclosure. Many variations and modifications can be made to the above-described embodiment(s) without departing substantially from the spirit and principles of the disclosure. All such modifications and variations are intended to be included herein within the scope of this disclosure and protected by the following claims.

At least the following is claimed:

1. A method to develop a model for predicting exploitability, comprising:
   constructing a vulnerability life cycle graph, the vulnerability life cycle graph including a plurality of state nodes each representative of a state of a vulnerability in a computing system;
   determining an initial probability of at least one state node among the plurality of state nodes;
   developing an absorbing transition probability matrix based on the vulnerability life cycle graph and the initial probability of the at least one state node;
   evaluating a vulnerability life cycle associated with the computing system using the absorbing transition probability matrix to determine a probability of the vulnerability of the computing system being exploited at a particular time; and
   developing a non-linear model to determine the probability of the vulnerability being exploited at the particular time.

2. The method according to claim 1, wherein the evaluating comprises iterating the absorbing transition probability matrix over a number of cycles using a Markovian process until the absorbing transition probability matrix reaches a steady state.

3. The method according to claim 1, wherein the evaluating comprises iterating the absorbing transition probability matrix over a number of cycles until the absorbing transition probability matrix reaches a steady state, wherein each of the number of cycles is representative of a period of time.

4. The method according to claim 3, further comprising determining the probability of the vulnerability of the computing system being exploited at the particular time through the iterating.

5. The method according to claim 3, wherein the plurality of state nodes include at least one absorbing state node and, during the iterating, the initial probability is absorbed into the at least one absorbing state node.

6. The method according to claim 5, wherein the at least one absorbing state node comprises at least one of a patched state node or an exploited state node.

7. The method according to claim 1, wherein determining the initial probability of the at least one state node comprises calculating a probability estimate for the at least one state node for at least one category of the Common Vulnerability Scoring System (CVSS) framework.

8. The method according to claim 1, wherein determining the initial probability of the at least one state node comprises calculating a probability estimate for the at least one state node as a proportion of a cumulative number of vulnerabilities in the computing system over a number of years.

9. The method according to claim 1, wherein determining the initial probability of the at least one state node comprises identifying a probability estimate for the at least one state node from a reference dataset.

10. The method according to claim 1, further comprising calculating the probability of the vulnerability being exploited or a probability of the vulnerability being patched based on the non-linear model.

11. The method according to claim 10, further comprising communicating the particular time, the probability of the vulnerability being exploited, or the probability of the vulnerability being patched to an information technology specialist to take remedial measures.

12. A system to develop a model for predicting exploitability, comprising:
a memory device configured to store computer-readable instructions thereon; and
at least one processing device directed, through execution of the computer-readable instructions, to:
construct a vulnerability life cycle graph, the vulnerability life cycle graph including a plurality of state nodes each representative of a state of a vulnerability in a computing system;
determine an initial probability of at least one state node among the plurality of state nodes;
develop an absorbing transition probability matrix based on the vulnerability life cycle graph and the initial probability of the at least one state node;
evaluate a vulnerability life cycle associated with the computing system using the absorbing transition probability matrix to determine a probability of the vulnerability of the computing system being exploited at a particular time; and
develop a non-linear model to determine the probability of the vulnerability being exploited at the particular time.

13. The system according to claim 12, wherein the at least one processing device is further configured to iterate the absorbing transition probability matrix over a number of cycles using a Markovian process until the absorbing transition probability matrix reaches a steady state.

14. The system according to claim 12, wherein the at least one processing device is further configured to iterate the absorbing transition probability matrix over a number of cycles until the absorbing transition probability matrix reaches a steady state, wherein each of the number of cycles is representative of a period of time.

15. The system according to claim 12, wherein the at least one absorbing state node comprises at least one of a patched state node or an exploited state node.

16. A method to develop a model for predicting exploitability, comprising:
constructing a vulnerability life cycle graph, the vulnerability life cycle graph including a plurality of state nodes each representative of a state of a vulnerability in a computing system;
determining an initial probability of at least one state node among the plurality of state nodes;
developing an absorbing transition probability matrix based on the vulnerability life cycle graph and the initial probability of the at least one state node;
iterating the absorbing transition probability matrix over a number of cycles until the absorbing transition probability matrix reaches a steady state; and
developing a non-linear model to determine a probability of the vulnerability of the computing system being exploited at a particular time.

17. The method according to claim 16, wherein the iterating provides a probability metric of the vulnerability being exploited as a function of time and a probability metric of the vulnerability being patched as a function of time.

18. The method according to claim 16, wherein determining the initial probability of the at least one state node comprises calculating a probability estimate for the at least one state node for at least one category of the Common Vulnerability Scoring System (CVSS) framework.

* * * * *